(12) United States Patent
Agarwal et al.

(10) Patent No.: US 11,934,578 B1
(45) Date of Patent: Mar. 19, 2024

(54) APPARATUS, SYSTEM, AND METHOD FOR CONTROLLING SOFT FLUIDIC ACTUATORS VIA SENSOR FEEDBACK AND MACHINE LEARNING MODELS

(71) Applicant: META PLATFORMS TECHNOLOGIES, LLC, Menlo Park, CA (US)

(72) Inventors: Priyanshu Agarwal, Kirkland, WA (US); Nicholas Colonnese, Kirkland, WA (US); Heng Xu, Redmond, WA (US); Benjamin Stephens-Fripp, Redmond, WA (US); Daniele Piazza, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 260 days.

(21) Appl. No.: 17/313,876

(22) Filed: May 6, 2021

Related U.S. Application Data

(60) Provisional application No. 63/072,461, filed on Aug. 31, 2020, provisional application No. 63/054,629, filed on Jul. 21, 2020.

(51) Int. Cl.
  *G06F 3/01* (2006.01)
  *G02B 27/01* (2006.01)
  *G06N 3/08* (2023.01)

(52) U.S. Cl.
  CPC .......... *G06F 3/016* (2013.01); *G02B 27/017* (2013.01); *G06F 3/014* (2013.01); *G06N 3/08* (2013.01)

(58) Field of Classification Search
  CPC ....... G06F 3/016; G06F 3/014; G02B 27/017; G06N 3/08
  See application file for complete search history.

(56) References Cited

U.S. PATENT DOCUMENTS

| | | | |
|---|---|---|---|
| 2010/0141407 A1* | 6/2010 | Heubel | H04B 5/0037 340/407.1 |
| 2020/0250942 A1* | 8/2020 | Young | A63F 13/285 |
| 2021/0096649 A1* | 4/2021 | Mok | G06F 3/016 |

* cited by examiner

*Primary Examiner* — Phuong H Nguyen
(74) *Attorney, Agent, or Firm* — Greenberg Traurig, LLP

(57) ABSTRACT

The disclosed haptic feedback system may include an actuator, a supply valve coupled to the actuator, an exhaust valve, and a fluidic mass controller communicatively coupled to the supply valve and the exhaust valve. The fluidic mass controller may (1) place the exhaust valve in a state that prevents a fluid from escaping the actuator, (2) activate the supply valve to fill the actuator with an amount of the fluid, (3) determine that the actuator has filled with the amount of the fluid, and then in response to that determination, (4) deactivate the supply valve to trap the amount of the fluid in the actuator. Various other apparatuses, methods, and systems are also disclosed.

20 Claims, 15 Drawing Sheets

| Configuration | | Supply Valve State | | Exhaust Valve State | |
|---|---|---|---|---|---|
| Inflate | 352a | On | 354a | Off | 356a |
| Hold | 352b | Off | 354b | Off | 356a |
| Deflate | 352c | Off | 354b | On | 356b |

| Configuration | Supply Valve State | Exhaust Valve State |
|---|---|---|
| Inflate 452a | On 454a | On 456a |
| Hold 452b | Off 454b | On 456a |
| Deflate 452c | Off 454b | Off 456b |

Source Pressure = 10 psi
On-time = 600 msec

Source Pressure = 15 psi
On-time = 450 msec

Source Pressure = 30 psi
On-time = 300 msec

APPARATUS, SYSTEM, AND METHOD FOR CONTROLLING SOFT FLUIDIC ACTUATORS VIA SENSOR FEEDBACK AND MACHINE LEARNING MODELS

CROSS-REFERENCE TO RELATED APPLICATION

This application claims the benefit of priority under 35 U.S.C. § 119(e) to U.S. Provisional Application No. 63/072,461, filed Aug. 31, 2020, the contents of which are incorporated herein by reference in their entirety. This application also claims the benefit of priority under 35 U.S.C. § 119(e) to U.S. Provisional Application No. 63/054,629, filed Jul. 21, 2020, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
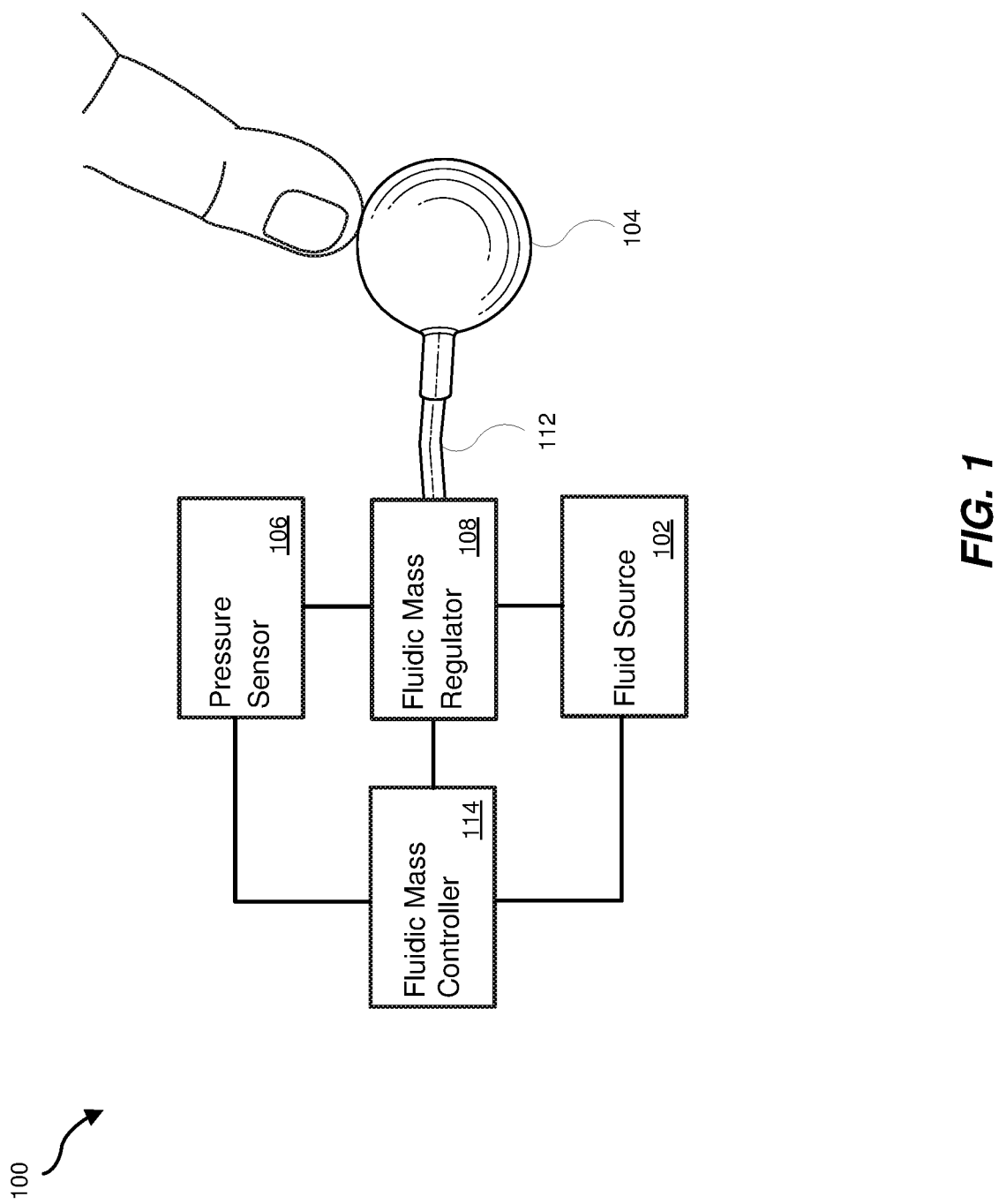
FIG. 1 is an illustration of an example system that includes a haptic feedback system controlling an actuator.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Haptic devices may be implemented and/or incorporated in systems, such as artificial reality systems, that involve kinesthetic and tactile learning. Considered an important part of an artificial reality system, haptic feedback may provide a realistic, high fidelity experience to a user of the system. For example, an artificial reality system may include one or more haptic features implemented in handheld devices, such as a joystick, wand, steering wheel, or other type of controller. In another example, an artificial reality system may include one or more haptic features implemented in wearable devices, such as a glove and/or a wristband. Each of these haptic features may provide and/or impart haptic feedback to a user of the artificial reality system.

In some examples, a haptic device may include one or more soft fluidic actuators that constitute and/or represent a pneumatic solution for providing force feedback detectable to a user. Haptic feedback systems may include haptic devices that rely on various components, such as fluid sources, valves, pressure regulators, and pressure sensors. Some traditional haptic feedback systems may use constant pressure control to operate their pressure regulators. Unfortunately, such constant pressure control may prevent these traditional haptic feedback systems from operating at their peak performance levels. For example, a haptic device operating on constant pressure control may fail to achieve the full range of forces (dynamic range) that are possible to render with an actuator at a given operational pressure. Additionally or alternatively, this haptic device operating on constant pressure control may suffer from a poor response latency.

For example, a haptic device may include and/or represent a tactile display that attempts to stimulate localized areas of the skin of a user. This stimulation may be intended to replicate and/or imitate the touch sensations that the user feels when touching or otherwise interacting with a real object. The user's skin may be highly sensitive to touch and/or have the ability to interpret various stimuli, such as an applied force or pressure provided by the force feedback. To satisfy and/or benefit the high sensitivity of the user's skin, a haptic device may be able to achieve and/or provide precise force feedback by using constant fluid mass control, as opposed to constant pressure control, to modify certain fluidic mass regulators. Constant fluid mass control may improve upon and/or overcome certain limitations of constant pressure control. For example, constant fluid mass control may enable a haptic device to achieve and/or reach a full range of forces (higher dynamic range), thereby providing and/or imparting force feedback that feels more natural and/or realistic to a user. Additionally, or alternatively, constant fluid mass control may enable the haptic device to achieve and/or provide a faster response time than constant pressure control, thereby further improving the natural and/or realistic feeling of the force feedback for the user.

The present disclosure is generally directed to apparatuses, systems, and methods for achieving more natural and/or realistic force feedback of actuators by implementing constant fluid mass control. As will be explained in greater detail below, embodiments of the present disclosure may involve and/or provide constant fluid mass control of an actuator included in a haptic feedback system. The haptic feedback system may include a fluidic mass regulator that controls the amount of fluid in the actuator. The fluidic mass regulator may include two valves, a supply valve coupled to the actuator and an exhaust valve coupled to the actuator and/or the supply valve. A fluidic mass controller may be communicatively coupled to the supply valve and/or the exhaust valve. The fluidic mass controller may (1) place the exhaust valve in a state that prevents a fluid from escaping the actuator, (2) activate the supply valve for a certain duration to fill the actuator with an amount of the fluid, (3) determine that the actuator has filled with the amount of the fluid, and then in response to determining that the actuator has filled with the amount of the fluid, (4) deactivate the supply valve to trap the amount of the fluid in the actuator.

In one example, this haptic feedback system may also include two fluidic valves, interfaced to an actuator, that implement a pneumatic solution for providing force feedback detectable to a user. In this example, one of those fluidic valves may be connected to a source that provides fluid of a certain pressure value to the actuator. A second fluidic valve may be connected to the actuator to exhaust, drain, or discharge at least some of the fluid from the actuator.

In some implementations, the second valve (an exhaust valve) may directly drain fluid from an actuator at the atmospheric pressure or at a vacuum pressure when connected to a vacuum pump. The direct draining of the fluid from the actuator by the exhaust valve may further accelerate the draining of the actuator. This direct draining may be necessary if symmetric inflation and/or deflation response times for the actuator are important, and if the actuator inflation time is accelerated using a much higher source pressure than the actuator operational pressure. The pressure differential between the source/drain and the actuator may govern the inflation/deflation time for the actuator.

In some implementations, if the exhaust valve directly drains at the atmospheric pressure, the pressure differential for deflation may be fixed for a given actuator operational pressure, while the pressure differential for inflation may be increased arbitrarily by using a higher pressure source. In these implementations, asymmetry in response times for inflation and deflation may occur. The use of a vacuum pump, however, may minimize this asymmetry in response times. The use of the vacuum pump may increase the pressure differential between the actuator and the drain during deflation. In addition or in the alternative, there may exist asymmetry in inflation and/or deflation response times of a soft actuator due to inherent nonlinearities in the mechanics of soft materials and/or fluids.

In some implementations, the fluidic valves may be two-way valves. In other implementations, the fluidic valves may be three-way valves. The haptic feedback system may use the two fluidic valves to trap a constant mass of fluid (e.g., air, water, etc.) inside the actuator during operation, as opposed to the use of a single valve (or no valve at all) to maintain the fluid at a constant pressure level. The ability to trap a constant mass of fluid in the actuator may facilitate faster and/or more precise changes in the actuator, which support a larger dynamic feedback range and/or reduce the response latency of the force feedback imparted to the user.

Figure 5A:
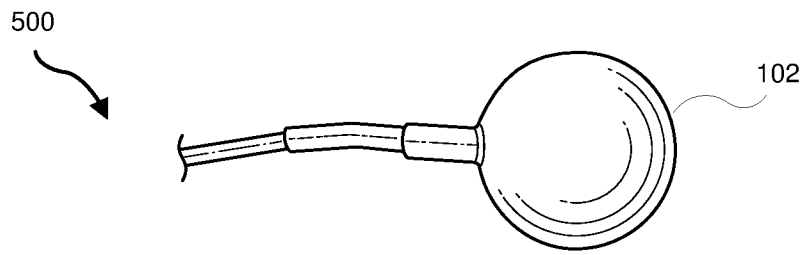
FIGS. 5A-C are illustrations of inflating an actuator with the same amount of fluid by varying the pressure and on-time of the delivery source of the fluid.
Figure 5B:
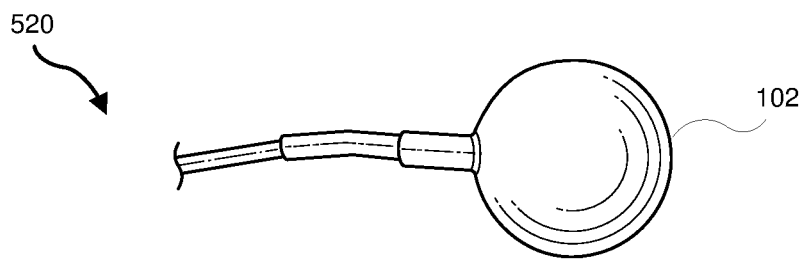
Figure 5C:
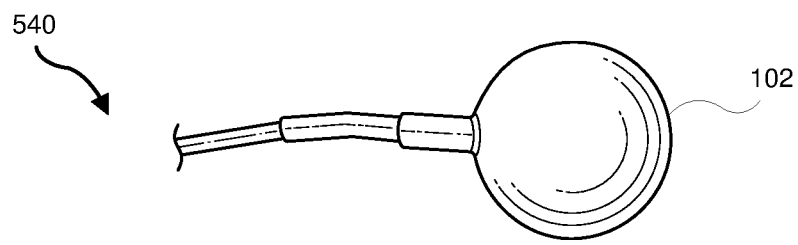
Figure 6:
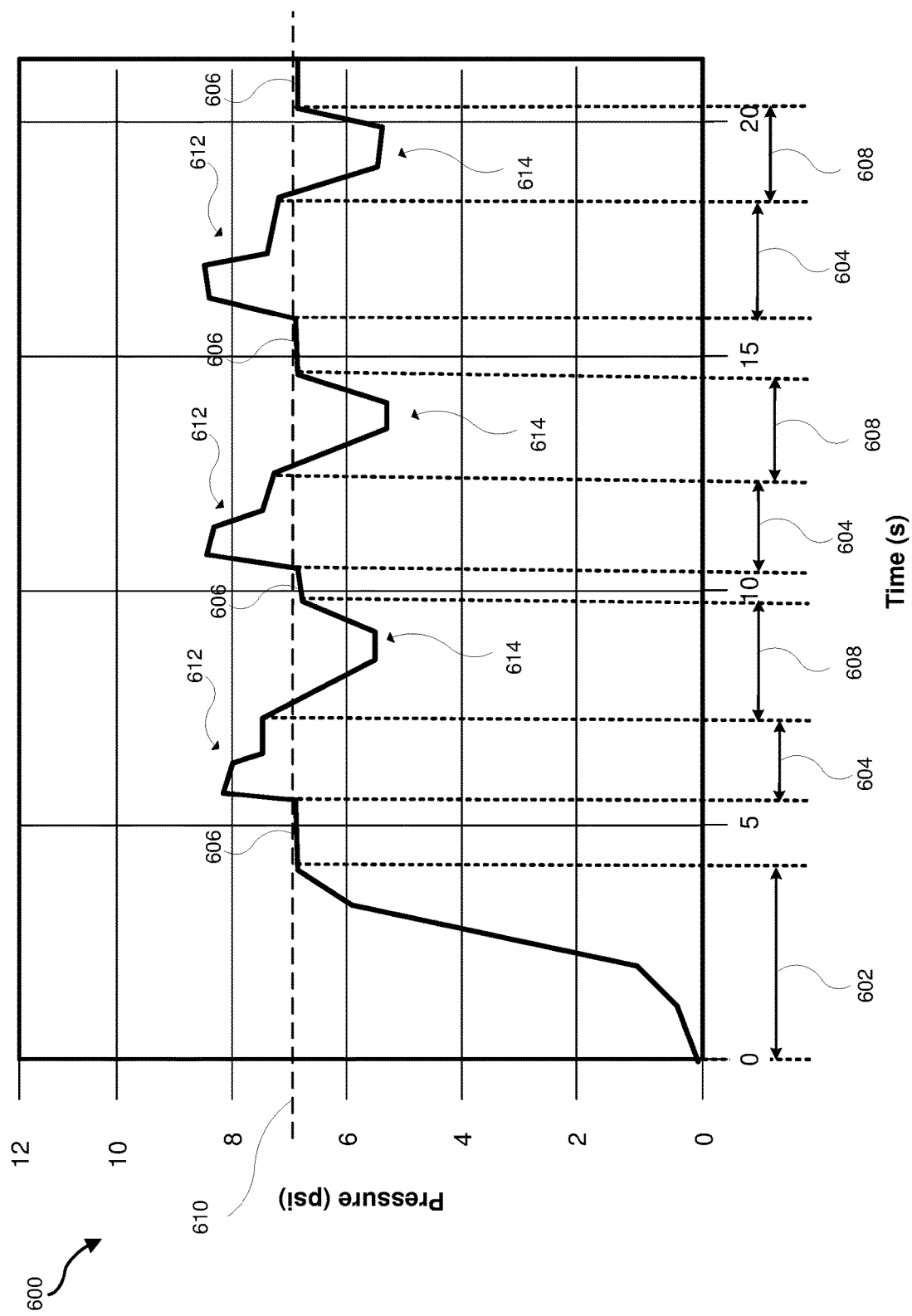
FIG. 6 is an illustration of an example graph of a change in pressure in an actuator over time for an actuator under constant pressure control as the actuator is being deformed and released.
Figure 7:
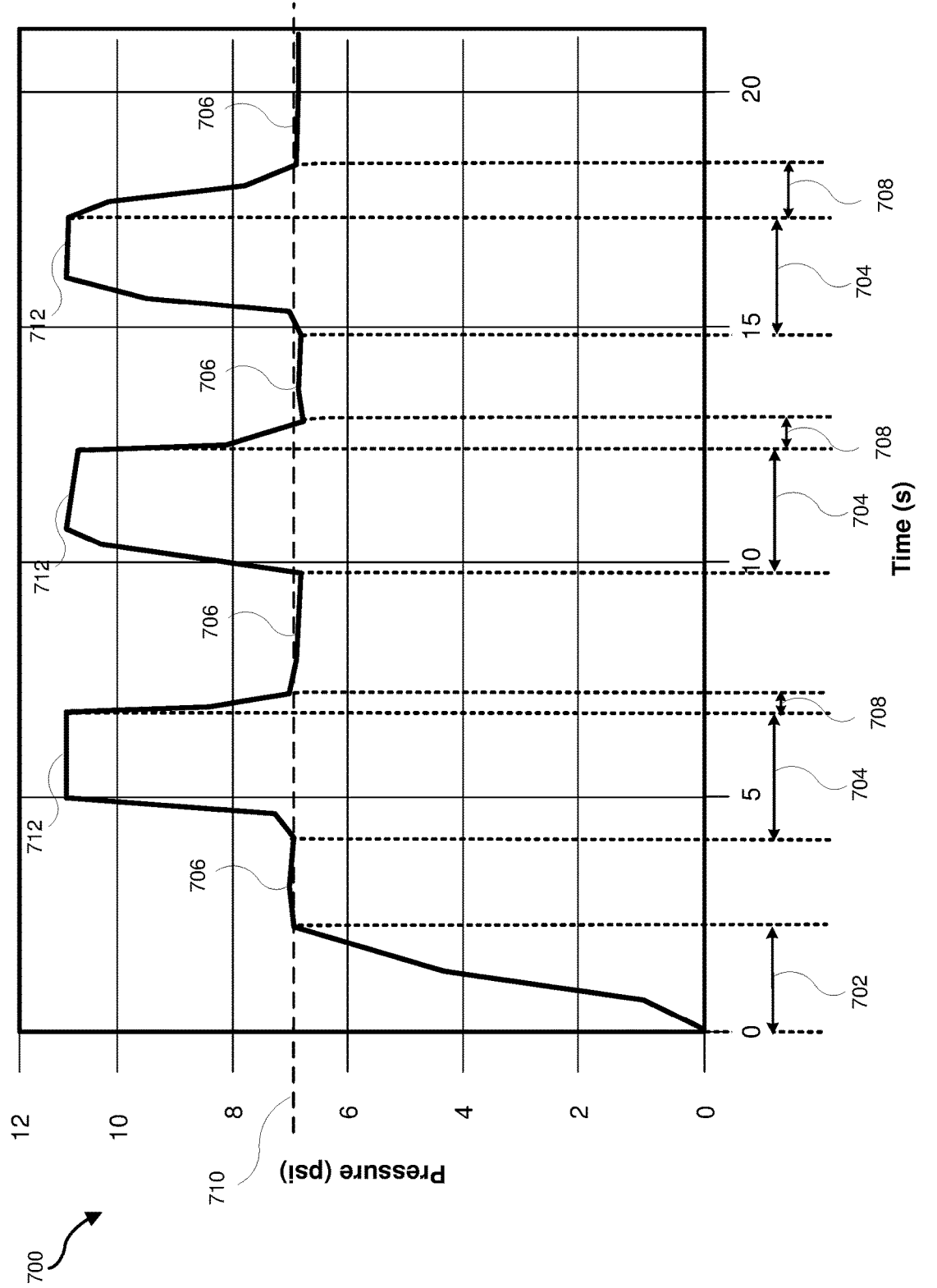
FIG. 7 is an illustration of an example graph of a change in pressure in an actuator over time for an actuator under constant fluid mass control as the actuator is being deformed and released.

The following will provide, with reference to FIG. 1, a detailed description of an example haptic feedback system that uses constant fluid mass control of an actuator. The descriptions corresponding to FIGS. 2, 3A-B, and 4A-B provide example valves and fluidic mass regulators for use in a haptic feedback system that implements constant fluid mass control of an actuator. The description corresponding to FIGS. 5A-C provide use cases of the constant fluid mass control of an actuator. The descriptions corresponding to FIGS. 6 and 7 provide graphs highlighting differences in force feedback and response latencies for an actuator under constant pressure control verses constant fluid mass control, respectively. Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 is an illustration of an example haptic feedback system 100. The haptic feedback system 100 may include an actuator 104, a fluid source 102, a pressure sensor 106, a fluidic mass regulator 108, and/or a fluidic mass controller 114. The actuator 104 may be attached or otherwise connected to an inlet 112. The actuator 104 may interface or connect to the fluidic mass regulator 108 by way of the inlet 112.

A haptic feedback system may implement constant fluid mass control when interfacing with an actuator. This implementation may include and/or involve controlling a value of a mass of fluid delivered to the actuator. The pressure of the fluid in the actuator may be measured as a force per unit area (e.g., pounds per square inch (psi)). For example, the fluidic mass controller 114 may control the delivery of the fluid from the fluid source 102 to the actuator 104 by way of the fluidic mass regulator 108. For example, the fluidic mass controller 114 may control the value of the pressure of the fluid delivered to the actuator 104 from the fluid source 102 by the way of the fluidic mass regulator 108. For example, the fluidic mass controller 114 may control the amount of time that the fluid is delivered by the fluid source 102 to the actuator 104 by controlling the fluidic mass regulator 108.

A haptic feedback system may include a pressure sensor for use in determining the pressure of the fluid included in the actuator (i.e., the actuator pressure). For example, the pressure sensor may make periodic or continuous measurements of the actuator pressure to determine when the actuator pressure reaches a predetermined pressure threshold. The actuator may be considered inflated when the value of the actuator pressure reaches the operational pressure value. The operational pressure value for the actuator may be a pressure level that does not cause undue stress to the actuator (e.g., causes the actuator to crack or explode) while providing the desired dynamic feedback range and response latency for the force feedback of the actuator. In some implementations, the pressure sensor 106 may monitor and/or measure the pressure of the actuator 104 by way of the fluidic mass regulator 108. In some implementations, the pressure sensor 106 may monitor and/or measure the pressure of the actuator 104 by directly interfacing or connecting to the actuator (e.g., by way of the inlet 112). In some implementations, the pressure sensor 106 may be a soft pressure sensor included in the actuator 104.

A pressure sensor may sense or receive information and data related to the current pressure level of an actuator. In some implementations, the pressure sensor 106 may be a soft pressure sensor included in the actuator 104 that may provide closed-loop control of the actuator pressure. In these implementations, the haptic feedback system 100 may use the soft pressure sensor to measure the pressure of the actuator 104. The pressure sensor 106 may provide the measurements to the fluidic mass controller 114. For example, the fluidic mass controller 114 may determine when the measured actuator pressure reaches the operational pressure value for the actuator. In response, the fluidic mass controller 114 may provide information and/or data to the fluidic mass regulator 108 to stop the fluid source 102 from providing additional fluid to the actuator 104. In addition, the fluidic mass controller 114 may control the fluidic mass regulator 108 to trap the fluid in the actuator 104.

Figure 10:
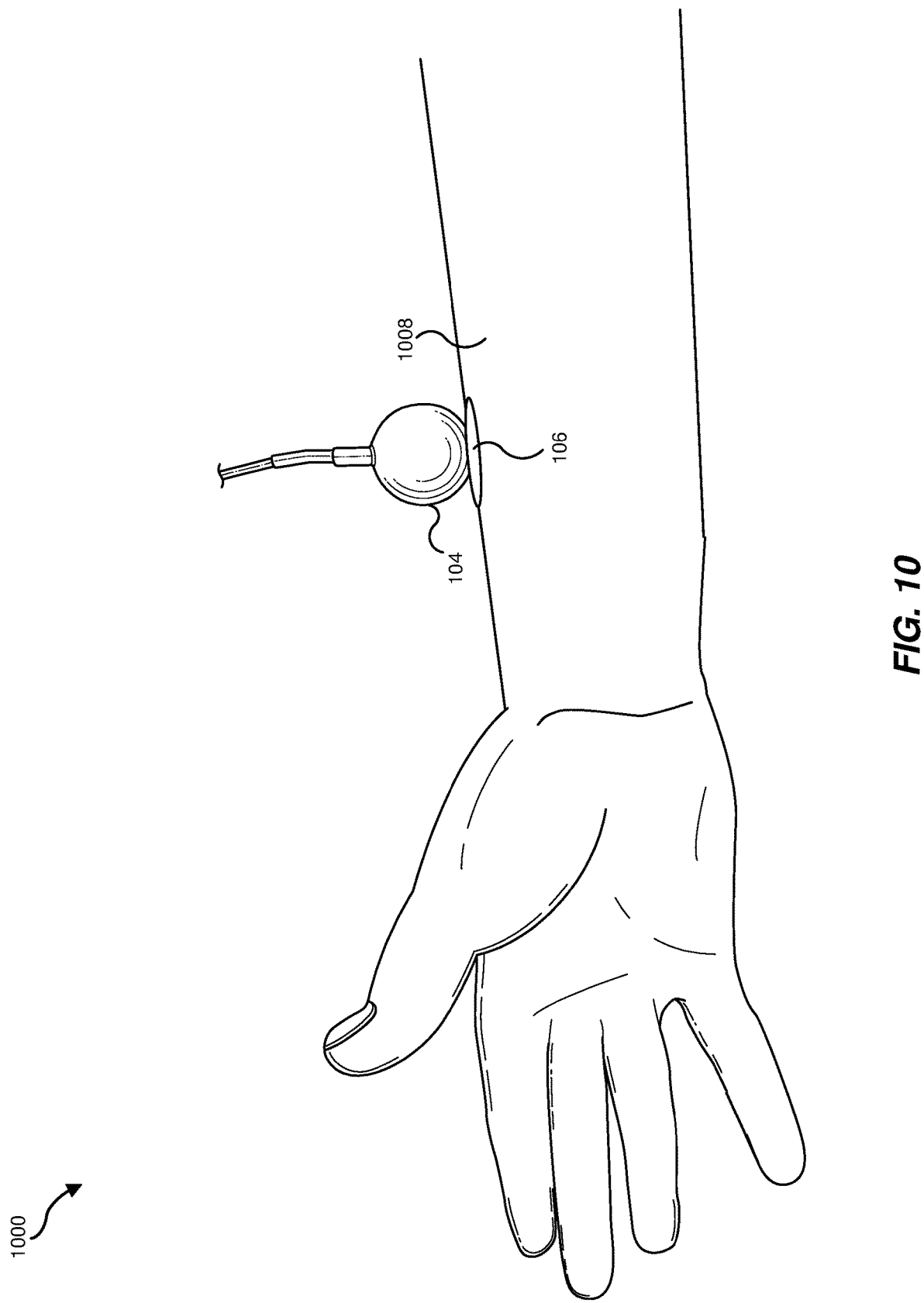
FIG. 10 is a flow diagram of an exemplary method for performing constant fluid mass control of an actuator.

In some examples, the pressure sensor 106 may be placed and/or positioned between the actuator 104 and the user's skin. For example, and as illustrated in FIG. 10, pressure sensor 106 may be coupled between the actuator 104 and a skin surface 1008 on the user's body. In one example, the pressure sensor 106 may sense and/or detect the amount of pressure present between the actuator 104 and the user's skin and/or the amount of pressure applied by the actuator 104 to the user's skin at any given time. In this example, the pressure sensor 106 may generate feedback information indicative of that amount of pressure and then provide such feedback information to the fluidic mass controller 114. Such feedback information may be captured, represented, and/or provided as analog data or signals and/or digital data or signals. As the pressure imparted by the actuator 104 increases or decreases, so too may the pressure readings generated and/or outputted by the pressure sensor 106, thereby providing instantaneous, real-time, and/or closed-loop feedback for the haptic feedback system 100.

In some examples, the fluidic mass controller 114 may use the feedback information from the pressure sensor 106 to control the pressure regulator 108. In other words, the fluidic mass controller 114 may modify one or more valves included in the pressure regulator 108 for the purpose of inflating and/or deflating the actuator 104 to a certain degree based at least in part on the feedback information. In such examples, the feedback information may inform the fluidic mass controller 114 as to how much to inflate and/or deflate the actuator 104 to reach and/or achieve the desired pressure level. Additionally or alternatively, the feedback information may lead the fluidic mass controller 114 to modify predicted inflation and/or deflation times due to certain errors and/or differences between the predicted times and the actual times.

In some examples, the pressure sensor 106 may be placed in direct contact with the user's skin. In one example, the pressure sensor 106 applied to the haptic feedback system 100 may be selected based at least in part on certain desired characteristics, such as a thin profile and/or a softness quality. For example, the pressure sensor 106 may ideally be as thin as possible and/or as soft as possible.

Examples of the pressure sensor 106 include, without limitation, capacitive pressure sensors, piezoelectric pressure sensors, piezoresistive pressure sensors, pressure transducers, potentiometric pressure sensors, inductive pressure sensors, strain gauge pressure sensors, variable reluctance pressure sensors, linear variable differential transformers, manometer sensors, thin-film pressure sensors, magnetic pressure sensors, portions of one or more of the same, combinations or variations of one or more of the same, and/or any other suitable pressure sensors.

In some examples, the haptic feedback system 100 may be implemented and/or configured to incorporate a one-to-one ratio of sensors to actuators. In such examples, the haptic feedback system 100 may apply and/or incorporate one sensor for every actuator. Additionally or alternatively, the haptic feedback system 100 may be implemented and/or configured to incorporate a one-to-many ratio of sensors to actuators. For example, a single sensor may be configured to provide feedback information used to control the valves that facilitate inflating and/or deflating multiple actuators.

In some implementations, the pressure sensor 106 may interface with the fluidic mass regulator 108 to observe and/or monitor, via a learned actuator-specific model for open-loop control, the pressure of the actuator. For example, such a learned actuator-specific model may indicate and/or determine that, by providing fluid from a fluid source to an actuator at a particular pressure value for a specific amount of time, the actuator will fill to its operational pressure value.

A haptic feedback system may provide a certain amount of fluid to an actuator such that the actuator pressure reaches the operational pressure value of the actuator. In one example, a haptic feedback system that implements constant pressure control may continually provide fluid to an actuator at the operational actuator pressure value. In contrast, a haptic feedback system that implements constant fluid mass control may deliver fluid to an actuator at a pressure value higher than the operational pressure value for the actuator by controlling or modulating the amount of time that the fluid source delivers the fluid to the actuator at the higher pressure value. For example, the haptic feedback system 100 may shut down, stop, disable, or disconnect the fluid source 102 from the actuator 104 by way of the fluidic mass regulator 108 at a time when the actuator pressure measured by the pressure sensor 106 is approximately equivalent to the operational pressure value of the actuator. In another example, the haptic feedback system 100 may shut down, stop, disable, or disconnect the fluid source 102 from the actuator 104 by way of the fluidic mass regulator 108 at a certain time based on a learned actuator-specific model and the actuator pressure.

A haptic feedback system that implements constant fluid mass control may trap an amount, mass, or volume of fluid in an actuator upon disabling a fluid source. This trapping may maintain the mass of the fluid in the actuator at a constant amount and/or level. For example, a fluidic mass controller 114 may receive data from the pressure sensor 106 indicative of the measured pressure of the actuator 104. The fluidic mass controller 114 may determine that the measured value of the actuator pressure is essentially equivalent to the value of the operational pressure for the actuator. The fluidic mass controller 114 may provide information and data to the fluid source 102 and/or the fluidic mass regulator 108 to stop the fluid source 102 from providing fluid to the actuator 104 and/or to trap the provided fluid in the actuator 104. For example, the fluid source 102 may shut down, stopping the flow of fluid from the fluid source 102 to the actuator 104. The fluidic mass regulator 108 may control one or more valves included in the fluidic mass regulator 108 to trap the fluid in the actuator 104, thereby keeping the mass of the fluid in the actuator at a constant level or amount.

In some implementations, as shown with reference to FIGS. 5A-C, a haptic feedback system that implements constant fluid mass control may modulate the amount of time for providing fluid to an actuator dependent on the pressure level of the fluid. In one example, fluid may be provided to the actuator at a higher pressure level by a constant fluid mass control system than a constant pressure control system. This higher pressure level may result from the fluid being delivered for a shorter, and not continuous, period of time and then being trapped in the actuator when the actuator pressure reaches the operational actuator pressure value.

In some cases, the actuator pressure may be indicative of and/or responsive to a mechanical deformation of the actuator. For example, a user may interact with the actuator by causing a mechanical deformation of the actuator. The mechanical deformation may include and/or involve compressing and/or squeezing the actuator, thereby causing a reduction in the volume of the actuator. In a haptic feedback system that implements constant fluid mass control, the reduction of the volume of the actuator by way of compression and/or squeezing may increase the pressure of the actuator due at least in part to the fluid trapped in the actuator. This increase in actuator pressure may result in an increase in mechanical impedance for the actuator.

In some examples, a user of a kinesthetic display may sense the kinesthetic impedance of an actuator as the displacement of the actuator at a given surface. In one example, the user may sense the kinesthetic impedance of the actuator by using sensory organs (proprioceptors), such as, the hands and/or fingers of the user. The increased kinesthetic impedance responsive to the deformation of the actuator may provide reactive or endogenous force feedback to the user. In contrast, in a haptic feedback system that implements constant pressure control, a fluid included in an actuator may be maintained at a constant pressure level when the user interacts with the actuator, thereby providing active or exogenous force feedback to the user.

A fluid may include and/or represent a substance that changes shape in response to an applied force. Examples of such fluids include, but are not limited to, liquids, gasses, plasmas, air, combinations or variations of one or more of the same, and/or any other suitable fluids. For example, compressed air may be used in a haptic feedback system that implements constant fluid mass control. Compressed air may constitute and/or represent a lightweight compressible fluid with low viscosity. Compressed air may be provided by a fluid source and/or regulated by a fluidic mass regulator when activating and/or operating an actuator. For example, the fluid source 102 may provide compressed air to the fluidic mass regulator 108 for filling the actuator 104.

A fluidic mass controller may control the supplying of the fluid to the actuator. In some implementations, the fluidic mass controller may control the supply and/or delivery of the fluid to the actuator using one or more control parameters. For example, the fluidic mass controller 114 may include hardware and/or software for interfacing with the fluidic mass regulator 108, the pressure sensor 106, and/or the fluid source 102. The fluidic mass controller 114 may control a value of a pressure of a fluid and an amount of the fluid provided by the fluidic mass regulator 108 to the actuator 104 from the fluid source 102. For example, the fluidic mass controller 114 may provide a value of a pressure (e.g., in pounds per square inch (psi)) to the fluid source 102. The fluid source 102 may supply the fluid to the fluidic mass regulator 108 at the pressure value. The fluidic mass regulator 108 may provide the fluid at the pressure value to the actuator 104. The pressure sensor 106 may determine when the actuator 104 is inflated (e.g., filled with the fluid at the operational pressure level). Once the pressure sensor 106 determines that the actuator 104 is properly inflated, the pressure sensor 106 may provide an indication that the actuator 104 is so inflated to the fluidic mass controller 114. The fluidic mass controller 114 may provide an indication that the actuator 104 is so inflated to the fluidic mass regulator 108. The fluidic mass regulator 108 may block the fluid source 102 from supplying additional fluid to the actuator 104. In some implementations, in addition or in the alternative, the fluidic mass controller 114 may stop the fluid source 102 from supplying the fluid to the actuator 104 by way of the fluidic mass regulator 108 (e.g., shutting down the fluid source 102).

A pressure sensor may measure the pressure level of an actuator and/or provide such a measurement to the fluidic mass controller 114. Pressure sensors may measure pressure in a variety of ways, employ different sensing principles, and/or output different types of signals and/or data. For example, a pressure sensor may include and/or represent a gauge sensor that measures actuator pressure relative to atmospheric pressure. In this example, the gauge sensor may output an analog voltage representative of the measured actuator pressure. Additionally or alternatively, the pressure sensor 106 may measure the pressure of compressed air provided by the fluidic mass regulator 108 to the actuator 104.

In some examples, when the actuator is mechanically deformed, the pressure level of the fluid in the actuator may change. A pressure sensor may provide a measurement and/or indication of this pressure change. The change in pressure may be related to the haptic interaction of a user with the actuator. For example, the pressure sensor 106 may measure the current pressure level of the actuator 104 when the actuator 104 is deformed by the user in one way or another.

A fluidic mass regulator may include one or more valves that control the flow of fluid from a fluid source into an actuator. For example, the fluidic mass regulator 108 may control the flow of fluid from the fluid source 102 into the actuator 104 by way of the inlet 112. As will be described with reference to FIGS. 3A-B and 4A-B, the fluidic mass regulator 108 may include one or more valves (e.g., two valves) that control the flow of fluid from the fluid source 102 into the actuator 104. In some implementations, the fluidic mass controller 114 may control or set the pressure level of the fluid delivered by the fluid source 102 to the actuator 104. The fluidic mass regulator 108 may control one or more valves that regulate the flow of the fluid into the actuator 104 by allowing the fluid provided by the fluid source 102 to flow into the actuator 104. The fluidic mass regulator 108 may further control one or more valves that regulate the flow of the fluid into the actuator 104 by stopping the flow of the fluid when the pressure level of the actuator 104 reaches the operational pressure value. The fluidic mass regulator 108, when stopping the flow of the fluid into the actuator 104, may also cause the one or more valves to hold or trap the mass of fluid in the actuator.

Figure 2:
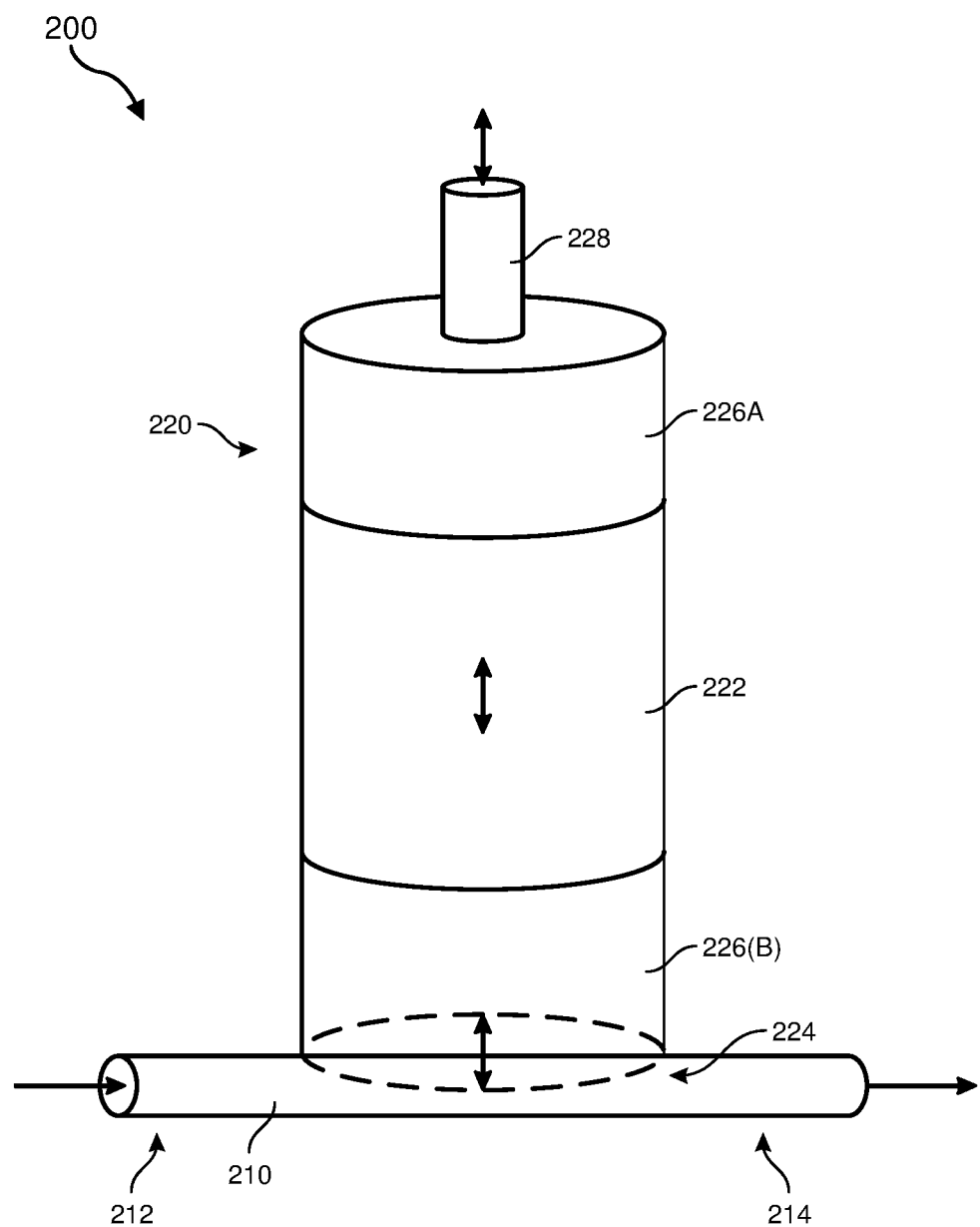
FIG. 2 is an illustration of an exemplary fluidic control system that may be used in connection with embodiments of this disclosure.

FIG. 2 shows a schematic diagram of a fluidic valve 200 for controlling flow through a fluid channel 210, according to at least one embodiment of the present disclosure. As will be described with reference to FIGS. 3A-B and FIGS. 4A-B, one or more fluidic valves may be included in a fluidic mass regulator for a haptic feedback system. As described herein, the embodiments of the present disclosure may include haptic fluidic systems (e.g., referring to FIG. 1, the haptic feedback system 100) that involve the control (e.g., stopping, starting, restricting, increasing, etc.) of fluid flow through a fluid channel. A fluidic valve may control the fluid flow. Fluid from a fluid source (e.g., a pressurized fluid source, a fluid pump, etc.) may flow through the fluid channel 210 from an inlet port 212 to an outlet port 214, which is operably coupled to, for example, a fluid-driven mechanism, another fluid channel, or a fluid reservoir.

Fluidic valve 200 may include a gate 220 for controlling the fluid flow through fluid channel 210. Gate 220 may include a gate transmission element 222, such as a movable component configured to transmit an input force, pressure, or displacement to a restricting region 224 to restrict or stop flow through the fluid channel 210. Conversely, in some examples, application of a force, pressure, or displacement to gate transmission element 222 may result in opening restricting region 224 to allow or increase flow through the fluid channel 210. The force, pressure, or displacement applied to gate transmission element 222 may be referred to as a gate force, gate pressure, or gate displacement. Gate transmission element 222 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 2, gate 220 of fluidic valve 200 may include one or more gate terminals, such as an input gate terminal 226(A) and an output gate terminal 226(B) (collectively referred to herein as "gate terminals 226") on opposing sides of gate transmission element 222. Gate terminals 226 may be elements for applying a force (e.g., pressure) to gate transmission element 222. By way of example, gate terminals 226 may each be or include a fluid chamber adjacent to gate transmission element 222. Alternatively or additionally, one or more of gate terminals 226 may include a solid component, such as a lever, screw, or piston, that is configured to apply a force to gate transmission element 222.

In some examples, a gate port 228 may be in fluid communication with input gate terminal 226(A) for applying a positive or negative fluid pressure within the input gate terminal 226(A). A control fluid source (e.g., a pressurized fluid source, a fluid pump, etc.) may be in fluid communication with gate port 228 to selectively pressurize and/or depressurize input gate terminal 226(A). In additional embodiments, a force or pressure may be applied at the input gate terminal 226(A) in other ways, such as with a piezoelectric element or an electromechanical actuator, etc.

In the embodiment illustrated in FIG. 2, pressurization of the input gate terminal 226(A) may cause the gate transmission element 222 to be displaced toward restricting region 224, resulting in a corresponding pressurization of output gate terminal 226(B). Pressurization of output gate terminal 226(B) may, in turn, cause restricting region 224 to partially or fully restrict to reduce or stop fluid flow through the fluid channel 210. Depressurization of input gate terminal 226(A) may cause gate transmission element 222 to be displaced away from restricting region 224, resulting in a corresponding depressurization of the output gate terminal 226(B). Depressurization of output gate terminal 226(B) may, in turn, cause restricting region 224 to partially or fully expand to allow or increase fluid flow through fluid channel 210. Thus, gate 220 of fluidic valve 200 may be used to control fluid flow from inlet port 212 to outlet port 214 of fluid channel 210.

Figures 3A, 3B:
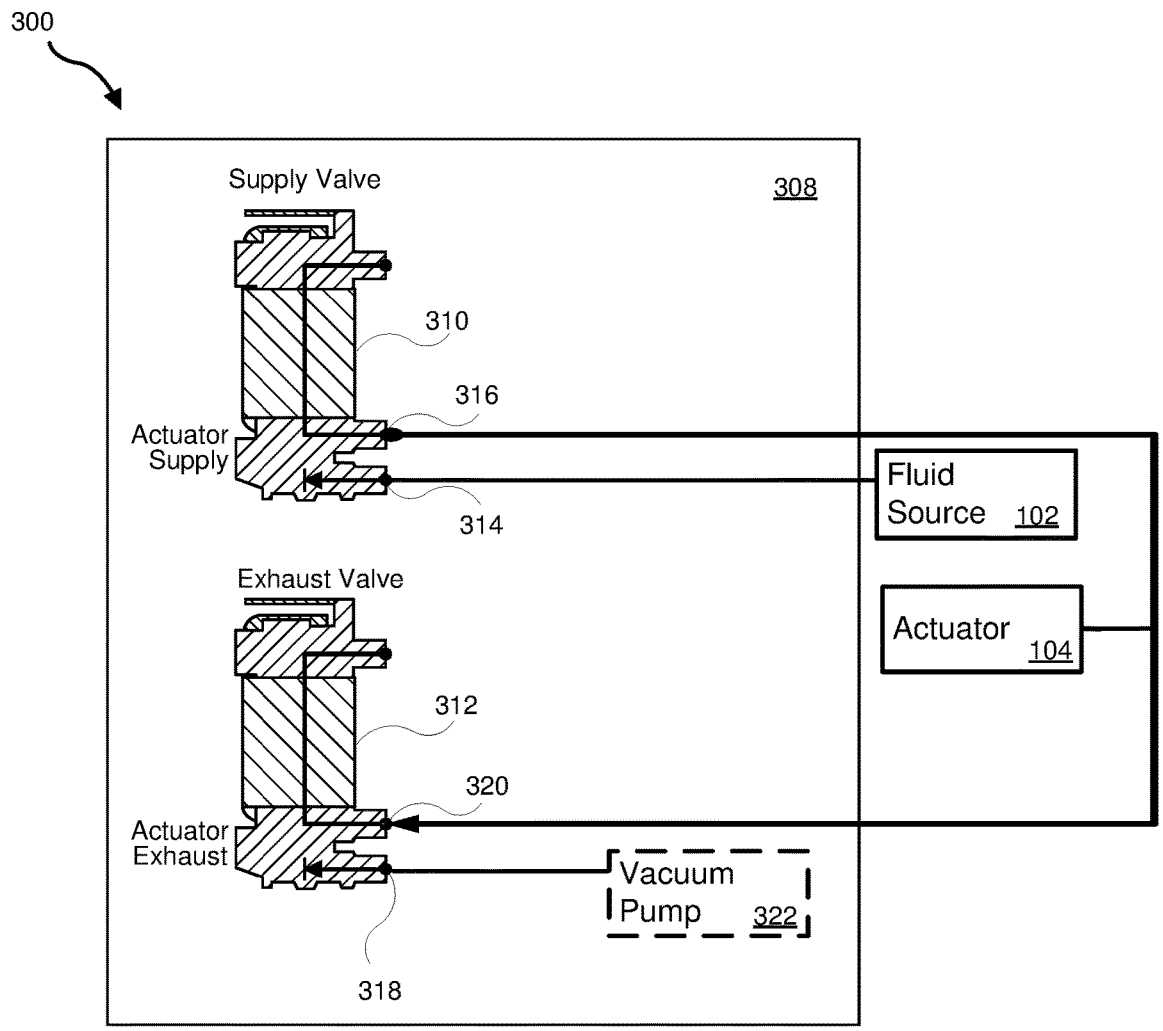
FIG. 3A is an illustration of an example implementation of a fluidic mass regulator for an actuator.
FIG. 3B is an illustration of a table that shows a state of a supply valve and a state of an exhaust valve when implementing constant fluid mass control of an actuator in the example implementation shown in FIG. 3A.

FIG. 3A is an illustration of an example implementation 300 of a fluidic mass regulator 308 for the actuator 104. A haptic feedback system that implements constant fluid mass control (such as the haptic feedback system 100 in FIG. 1) may incorporate and/or perform the implementation 300. For example, the fluidic mass regulator 308 in FIG. 3 may be an implementation and/or expansion of the fluidic mass regulator 108 in FIG. 1.

A fluidic mass regulator may include one or more valves, such as a supply valve and/or an exhaust valve. For example, the fluidic mass regulator 308 may include a supply valve 310 and an exhaust valve 312. The supply valve 310 may be a two-way valve in a normally closed configuration that includes a supply valve inlet port 314 and a supply valve outlet port 316. The exhaust valve 312 may be a two-way valve in a normally closed configuration that includes an exhaust valve inlet port 318 and an exhaust valve outlet port 320. The actuator 104 may be connected to the supply valve outlet port 316 and the exhaust valve outlet port 320. The fluid source 102 may be connected to the supply valve inlet port 314.

FIG. 3B is an illustration of a table 350 that shows different states of the supply valve 310 and the exhaust valve 312 when implementing constant fluid mass control of the actuator 104 in the fluidic mass regulator 308 in FIG. 3A. In a haptic feedback system that implements constant fluid mass control, a fluidic mass controller may control the operation of valves included in a fluidic mass regulator when inflating, deflating, and/or maintaining an actuator. As illustrated in FIG. 3B, table 350 may demonstrate exemplary configurations 352a-c (e.g., inflate, hold, and deflate, respectively). Specifically, table 350 may indicate and/or show the respective states of the supply valve 310 and the exhaust valve 312 in each of configurations 352a-c. Accordingly, fluidic mass controller 114 may be able to control the operation and/or states of the supply valve 310 and the exhaust valve 312 to achieve and/or implement one of three configurations 352a-c (e.g., inflate, hold, and deflate, respectively).

In an inflate configuration, the valves may be in states that allow fluid supplied by a fluid source to flow into and inflate an actuator. Referring to FIGS. 1 and 3A-B, a fluidic mass controller (e.g., the fluidic mass controller 114) may control the fluidic mass regulator 308 to place the supply valve 310 in an ON state (state 354a) and the exhaust valve 312 in an OFF state (state 356a) when inflating the actuator 104. The supply valve 310 may be in a normally closed state. In the normally closed state, the supply valve 310 may be in an OFF state. The normally closed (OFF state) of the supply valve 310 may block the supply valve inlet port 314 from the supply valve outlet port 316 (e.g., the supply valve inlet port 314 may not be connected to the supply valve outlet port 316). In this state, the supply valve 310 may block or disconnect the fluid source 102 from the actuator 104.

However, placing the supply valve in the ON state (state 354a) may unblock the supply valve inlet port 314 from the supply valve outlet port 316 (e.g., the supply valve inlet port 314 may be connected to the supply valve outlet port 316). In this state, the supply valve 310 may unblock the fluid source 102, connecting the fluid source 102 to the actuator 104 and thereby providing fluid to the actuator 104. The exhaust valve 312 may be in a normally closed state. In the normally closed state, the exhaust valve 312 may be in an OFF state. The normally closed (OFF state) of the exhaust valve 312 may block the exhaust valve inlet port 318 from the exhaust valve outlet port 320 (e.g., the exhaust valve inlet port 318 may not be connected to the exhaust valve outlet port 320). In this state, the fluid in the actuator 104 may not escape or exit from the actuator 104 by way of the exhaust valve 312. Therefore, in the inflate configuration 352a, placing the supply valve 310 in the ON state 354a and the exhaust valve 312 in the OFF state 356a may inflate the actuator 104, filling the actuator 104 with fluid provided by the fluid source 102.

In a hold configuration, the valves may be in states that allow the trapping of fluid, supplied by a fluid source, in an actuator. Referring to FIGS. 1 and 3A-B, a fluidic mass controller (e.g., the fluidic mass controller 114) may control the fluidic mass regulator 308 to place the supply valve 310 in an OFF state (state 354b) and the exhaust valve 312 in an OFF state (state 356a) when trapping the fluid in the actuator 104. Putting the supply valve 310 in an OFF state 354b may place the supply valve 310 into a normally closed state. The normally closed (OFF state) of the supply valve 310 may block the supply valve inlet port 314 from the supply valve outlet port 316 (e.g., the supply valve inlet port 314 may not be connected to the supply valve outlet port 316). In this state, the supply valve 310 may block or disconnect the fluid source 102 from the actuator 104.

Putting the exhaust valve 312 in the normally closed (OFF state) may block the exhaust valve inlet port 318 from the exhaust valve outlet port 320 (e.g., the exhaust valve inlet port 318 may not be connected to the exhaust valve outlet port 320). In this state, the fluid in the actuator 104 may not escape or exit from the actuator 104 by way of the exhaust valve 312. Therefore, in the hold configuration 352b, the supply valve 310 may be placed in the OFF state 354b and the exhaust valve 312 may be placed in the OFF state 356a to hold the fluid in the actuator 104. Accordingly, the hold configuration 352b may stop the fluid from filling the actuator 104 by way of the supply valve 310 and also stop the fluid from escaping or exiting the actuator 104 by way of the exhaust valve 312, thereby trapping or holding the fluid in the actuator 104.

In an deflate configuration, the valves may be in states that allow fluid to escape an actuator, deflating the actuator. Referring to FIGS. 1 and 3A-B, a fluidic mass controller (e.g., the fluidic mass controller 114) may control the fluidic mass regulator 308 to place the supply valve 310 and the exhaust valve 312 into respective states responsive to haptic interaction of a user with the actuator. The haptic interaction may mechanically deform the actuator (e.g., compress or squeeze the actuator), thereby changing (e.g., increasing) the pressure of the fluid in the actuator. As described herein, a pressure sensor (e.g., the pressure sensor 106) may provide a measurement and/or indication of the pressure change to the fluidic mass controller 114. The fluidic mass controller 114 may then provide control signals to the fluidic mass regulator 308 to control and/or change the states of the supply valve 310 and the exhaust valve 312.

In the deflate configuration 352c, referring to FIGS. 1 and 3A-B, a fluidic mass controller (e.g., the fluidic mass controller 114) may control the fluidic mass regulator 308 to place the supply valve 310 in an OFF state (state 354b) and the exhaust valve 312 in an ON state (state 356b) when allowing the fluid in the actuator 104 to escape or flow out of the actuator 104. Putting the supply valve 310 into an OFF state 354b may place the supply valve into a normally closed state. The normally closed (OFF) state of the supply valve 310 may block the supply valve inlet port 314 from the supply valve outlet port 316 (e.g., the supply valve inlet port 314 may not be connected to the supply valve outlet port 316). In this state, the supply valve 310 may block or disconnect the fluid source 102 from the actuator 104.

Putting the exhaust valve 312 in the ON state may unblock the exhaust valve inlet port 318 from the exhaust valve outlet port 320 (e.g., the exhaust valve inlet port 318 may be connected to the exhaust valve outlet port 320). In this state, the fluid in the actuator 104 may escape or exit from the actuator 104 by way of the exhaust valve 312. Therefore, in the deflate configuration 352c, the supply valve 310 may be placed in the OFF state 354b and the exhaust valve 312 may be placed in the ON state 356b to allow the fluid in the actuator 104 to escape, exit, or flow out of the actuator 104.

In some implementations, the fluidic mass regulator 308 may optionally include a vacuum pump 322. For example, the exhaust valve 312 may be connected to the vacuum pump 322. Such a connection may allow the exhaust valve 312 to drain fluid from the actuator 104 at a vacuum pressure. Draining the fluid from the actuator 104 at a vacuum pressure may allow the fluid in the actuator 104 to escape, exit, and/or flow out of the actuator 104 faster as compared to the exhaust valve 312 draining the fluid from the actuator 104 at atmospheric pressure. The use of the vacuum pump 322 by the exhaust valve 312 may improve symmetric inflation and deflation response times for the actuator 104 as the vacuum pump 322 may increase the pressure differential between the actuator and the drain during deflation.

Figures 4A, 4B:
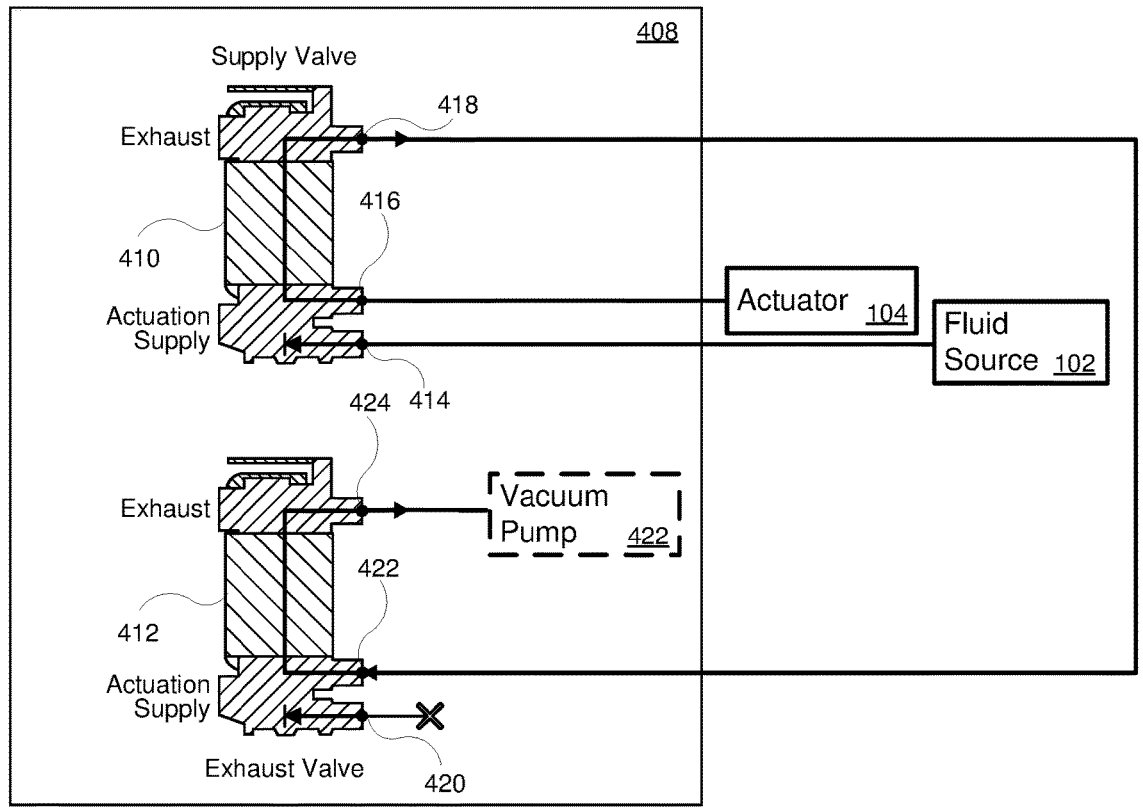
FIG. 4A is an illustration of another example implementation of a fluidic mass regulator for an actuator.
FIG. 4B is an illustration of a table that shows a state of a supply valve and a state of an exhaust valve when implementing constant fluid mass control of an actuator in the example implementation shown in FIG. 4A.

FIG. 4A is an illustration of an example implementation 400 of a fluidic mass regulator 408 for the actuator 104. A haptic feedback system that implements constant fluid mass control (such as the haptic feedback system 100 in FIG. 1) may incorporate the implementation 400. For example, referring to FIG. 1, the fluidic mass regulator 408 may be an implementation of the fluidic mass regulator 108.

A fluidic mass regulator may include one or more valves such as a supply valve and an exhaust valve. For example, the fluidic mass regulator 408 may include a supply valve 410 and an exhaust valve 312. The supply valve 410 may be a three-way valve that includes a supply valve first port 414, a supply valve second port 416, and a supply valve third port 418. The exhaust valve 412 may be a three-way valve that includes an exhaust valve first port 420, an exhaust valve second port 422, and an exhaust valve third port 424. The actuator 104 may be connected to the supply valve second port 416, which may in turn be connected to the supply valve third port 418. The fluid source 102 may be connected to the supply valve first port 414. The supply valve third port 418 may be connected to the exhaust valve second port 422. The exhaust valve second port 422 may be connected to the exhaust valve third port 424. The exhaust valve first port 420 may be blocked.

FIG. 4B is an illustration of a table 450 that shows a state of the supply valve 410 and a state of the exhaust valve 412 when implementing constant fluid mass control of the actuator 104 in the example implementation 400 shown in FIG. 4A. In a haptic feedback system that implements constant fluid mass control, a fluidic mass controller may control the operation and/or states of valves included in a fluidic mass regulator when inflating, deflating, and/or maintaining an actuator. As illustrated in FIG. 4B, table 450 may demonstrate exemplary configurations 452a-c (e.g., inflate, hold, and deflate, respectively). Specifically, table 450 may indicate and/or show the respective states of the supply valve 410 and the exhaust valve 412 in each of configurations 452a-c. Accordingly, fluidic mass controller 114 may be able to control the operation and/or states of the supply valve 410 and the exhaust valve 412 to achieve and/or implement one of three configurations 452a-c (e.g., inflate, hold, and deflate, respectively).

In an inflate configuration, the valves may be in states that allow fluid supplied by a fluid source to flow into and inflate an actuator. Referring to FIGS. 1 and 4A-B, a fluidic mass controller (e.g., the fluidic mass controller 114) may control the fluidic mass regulator 408 to place the supply valve 410 in an ON state (state 454a) and the exhaust valve 412 in an ON state (state 456a) when inflating the actuator 104. The ON state of the supply valve 410 may connect the supply valve first port 414 to the supply valve second port 416 connecting the fluid source 102 to the actuator 104 thereby providing fluid to the actuator 104. The ON state of the exhaust valve 412 may connect the exhaust valve first port 420, which may be blocked, to the exhaust valve second port 422. Therefore, in this state, the fluid in the actuator 104 may not escape or exit from the actuator 104 by way of the exhaust valve 412. In other words, in the inflate configuration 452a, placing the supply valve 410 in the ON state 454a and the exhaust valve 412 in the ON state 456a may inflate the actuator 104, filling the actuator 104 with fluid provided by the fluid source 102.

In a hold configuration, the valves may be in states that allow the trapping of fluid supplied by a fluid source in an actuator. Referring to FIGS. 1 and 4A-B, a fluidic mass controller (e.g., the fluidic mass controller 114) may control the fluidic mass regulator 408 to place the supply valve 410 in an OFF state (state 454b) and the exhaust valve 412 in an ON state (state 456a) to trap the fluid in the actuator 104. Putting the supply valve 410 into an OFF state may disconnect the supply valve first port 414 from the supply valve second port 416. In this state, the supply valve 410 may block or disconnect the fluid source 102 from the actuator 104.

Putting the exhaust valve 412 in the ON state may connect the exhaust valve first port 420, which may be blocked, to the exhaust valve second port 422. The exhaust valve second port 422 may be connected to the supply valve third port 418. The supply valve third port 418 may be connected to the actuator 104. In this state, the fluid in the actuator 104 may not escape or exit from the actuator 104 by way of the exhaust valve 412. Therefore, in the hold configuration 452b, the supply valve 410 may be placed in the OFF state 454b and the exhaust valve 412 may be placed in the ON state 456a to hold the fluid in the actuator 104. Accordingly, the hold configuration 452b may stop the fluid from filling the actuator 104 by way of the supply valve 410 and also stop the fluid from escaping or exiting the actuator 104 by way of the exhaust valve 412, thereby trapping or holding the fluid in the actuator 104.

In an deflate configuration, the valves may be in states that allow fluid to escape an actuator to facilitate deflation. Referring to FIGS. 1 and 4A-B, a fluidic mass controller (e.g., the fluidic mass controller 114) may control the fluidic mass regulator 408 to place the supply valve 410 and the exhaust valve 412 into respective states responsive to haptic interaction of a user with the actuator. The haptic interaction may mechanically deform the actuator (e.g., compress and/or squeeze the actuator) changing (e.g., increasing) the pressure of the fluid in the actuator. As described herein, a pressure sensor (e.g., the pressure sensor 106) may provide a measurement and/or indication of the pressure change to the fluidic mass controller 114. The fluidic mass controller 114 may provide control signals to the fluidic mass regulator 408 to control the states of the supply valve 410 and the exhaust valve 412.

In the deflate configuration 452c, referring to FIGS. 1 and 4A-B, a fluidic mass controller (e.g., the fluidic mass controller 114) may control the fluidic mass regulator 408 to place the supply valve 410 in an OFF state (state 454b) and the exhaust valve 412 in an OFF state (state 456b) to allow the fluid in the actuator 104 to escape or flow out of the actuator 104. Putting the supply valve 410 into an OFF state 454b may disconnect the supply valve first port 414 from the supply valve second port 416. In this state, the supply valve 410 may block or disconnect the fluid source 102 from the actuator 104.

Putting the exhaust valve 412 in the OFF state may disconnect the exhaust valve first port 420, which may be blocked, from the exhaust valve second port 422. The exhaust valve second port 422 may be connected to the supply valve third port 418. The supply valve third port 418 may be connected to the actuator 104. In this state, the fluid in the actuator 104 may escape or exit from the actuator 104 by way of the exhaust valve third port 424. Therefore, in the deflate configuration 452c, the supply valve 410 may be placed in the OFF state 454b and the exhaust valve 412 may be placed in the OFF state 456b to allow the fluid in the actuator 104 to escape, exit, or flow out the exhaust valve 412.

In some implementations, the fluidic mass regulator 408 may optionally include a vacuum pump 422. For example, the exhaust valve 412 may be connected to the vacuum pump 422. Such a connection may allow the exhaust valve 412 to drain fluid from the actuator 104 at a vacuum pressure. Draining the fluid from the actuator 104 at a vacuum pressure may allow the fluid in the actuator 104 to escape, exit, and/or flow out of the actuator 104 faster as compared to the exhaust valve 412 draining the fluid from the actuator 104 at atmospheric pressure. The use of the vacuum pump 422 by the exhaust valve 412 may improve symmetric inflation and deflation response times for the actuator 104 as the vacuum pump 422 may increase the pressure differential between the actuator and the drain during deflation.

FIGS. 5A-C are illustrations of inflating an actuator with the same amount or mass of fluid by varying the pressure and on-time of the delivery source of the fluid. A learned actuator-specific model may determine a pressure verses time model for a specific type of actuator. For example, actuator configuration 500 in FIG. 5A, actuator configuration 520 in FIG. 5B, and/or actuator configuration 540 in FIG. 5C may be included in a learned actuator-specific model. An actuator-specific model may include and/or involve one or more specific pressures of a fluid provided to the actuator for a respective specific amount of time to achieve a certain operational pressure level. As described herein, the pressure sensor 106 may interface with the fluidic mass regulator 108 to observe and/or monitor, via a learned actuator-specific model for open-loop or closed-loop control, the pressure of the actuator. For example, such a learned actuator-specific model may indicate and/or determine that, by providing fluid from a fluid source to an actuator at a particular pressure value for a specific amount of time, the actuator will fill to its operational pressure value.

As shown in FIGS. 5A-C, the actuator 104 may be filled with the same amount or mass of fluid to achieve approximately the same pressure (e.g., the operational pressure level for the actuator 104). In some examples, a fluid source may supply fluid to the actuator 104. The fluid source may provide the fluid at a certain pressure level (e.g., as measured in pounds per square inch (psi)). The fluid source may provide the fluid to the actuator for a specific amount of time (e.g., as measured in milliseconds (ms)) at that pressure level. For example, referring to FIG. 1, fluid source 102 may supply fluid to the actuator 104 at various pressure levels and/or delivery times.

As illustrated in FIGS. 5A-C, the fluid source may provide a pressure level (e.g., 10 psi, 15 psi, and 30 psi) of the fluid to fill the actuator 104 at different times (e.g., 600 ms, 450 ms, and 300 ms). The fluid source 102 may supply the fluid to the fluidic mass regulator 108 at that pressure level. Additionally or alternatively, the fluidic mass regulator 108 may provide and/or deliver the fluid at that pressure level to the actuator 104 for the specified amount of time (e.g., as controlled by the fluidic mass controller 114).

As shown in FIGS. 5A-C, as the pressure of the fluid source increases, the delivery time of the fluid decreases. In some implementations, the pressure of the source fluid may be greater than the operational pressure value of the actuator. However, because the delivery times of the fluid may depend on the pressure of the fluid source, the actuator may be inflated using a fluid source whose pressure is higher than the operational pressure value of the actuator. By doing so, the actuator may inflate faster without sustaining any damage. In other words, the actuator may be able to fill to its operational pressure level at a reduced time, thereby improving the haptic force feedback and response latency of the actuator.

FIG. 6 is an illustration of an example graph 600 that demonstrates changes in pressure of an actuator over time as the actuator is inflated, maintained at a constant pressure, and/or deformed under constant pressure control.

FIG. 7 is an illustration of an example graph 700 that demonstrates changes in pressure of an actuator over time as the actuator is inflated, maintained at a constant pressure, and/or deformed under constant fluid mass control. For example, referring to FIGS. 1, 3, 4, and 5A-C, the graph 700 may correspond to and/or represent the actuator 104.

In some implementations, a haptic feedback system may control an actuator using constant pressure control. In other implementations, a haptic feedback system may control an actuator using constant fluid mass control. These implementations may use the same type of actuator. For example, the graph 600 and the graph 700 may correspond to and/or represent the same type of actuator using different implementations of pressure control.

As a specific example, referring to FIG. 6 and FIG. 7, the graph 600 and the graph 700 may correspond to and/or represent the same actuator filled to an operational pressure value of approximately 7 psi. The fluctuation in pressure value verses time for the actuator may be a function of squeezing (deforming) and/or not squeezing (releasing, not deforming) the actuator. The squeezing of the actuator may cause the value of the pressure of the actuator, and therefore the kinesthetic impedance of the actuator, to increase. Not squeezing the actuator may cause the value of the pressure of the actuator to decrease and/or return to the operational pressure value of the actuator. The squeezing and releasing of the actuator may account for the fluctuations in the pressure values of the actuator shown in the graph 600 and the graph 700.

As demonstrated by the graph 600 and the graph 700, constant fluid mass control may result in and/or lead to greater changes or fluctuations in actuator pressure in response to the squeezing and/or releasing of the actuator. In addition, not only are the changes or fluctuations in the value of the actuator pressure greater with constant fluid mass control than with constant pressure control, but such changes or fluctuations may occur faster with constant fluid mass control than with constant pressure control. As further demonstrated by the graph 600 and the graph 700, constant fluid mass control may enable an actuator to provide more natural force feedback by offering a fuller dynamic range of inflation and/or deflation and/or by reducing the response latency of the haptic feedback device. Additionally or alternatively, constant fluid mass control may enable the actuator to reach and/or achieve a certain operational pressure value faster, thereby improving the user's detection and/or interpretation of the force feedback provided by the actuator.

Referring to FIG. 6 and FIG. 7, the amount of time 602 needed to fill the actuator to its operational pressure value 610 (e.g., approximately 7 psi) under constant pressure control may be longer than the amount of time 702 needed to fill the actuator to its operational pressure value 710 (e.g., approximately 7 psi) under constant fluid mass control. As represented in FIG. 6, once the actuator is inflated (e.g., filled with fluid to the operational pressure value of the actuator), the actuator pressure may remain at a constant and/or steady state level 606 under constant pressure control. As represented in FIG. 7, once the actuator is inflated (e.g., filled with fluid to the operational pressure value of the actuator), the actuator pressure may remain at a constant and/or steady state level 706 under constant fluid mass control.

In some examples, deforming (e.g., squeezing) the actuator may cause an increase in the pressure level and/or kinesthetic impedance of the actuator. Referring to FIG. 6, a haptic feedback control system that uses constant pressure control may maintain the actuator at the operational pressure value 610 to keep the actuator inflated. In this haptic feedback control system, the pressure value 612 of the actuator may not change significantly in response to a deformation of the actuator at time 604. In addition or in the alternative, at the time 604 (e.g., the time during which a user mechanically deforms the actuator), fluctuations in the pressure value 612 of the actuator may occur due to the fluidic mass regulator's slow response under constant pressure control.

Referring to FIG. 7, a haptic feedback control system that uses constant fluid mass control may inflate the actuator to trap a mass of fluid in the actuator at the operational pressure value 710. Because the mass of fluid is trapped in the actuator, the pressure in the actuator may increase to a pressure value 712, which is significantly higher than an actuator operational pressure value 710, when the actuator is squeezed or deformed. The higher pressure value may increase kinesthetic impedance of the actuator, thereby offering a more natural force feedback to a user. In contrast to constant pressure control, constant fluid mass control may result in and/or lead to little to no fluctuations in the pressure value 712 of the actuator during the time 704 (e.g., the time during which a user mechanically deforms the actuator). Additionally or alternatively, in contrast to constant pressure control, constant fluid mass control may reach the higher pressure value very quickly.

Subsequent to the mechanical deformation of the actuator, the user may release or no longer squeeze the actuator. Referring to FIG. 6, under constant pressure control, releasing or not squeezing the actuator may result in the actuator pressure returning to the constant and/or steady state level 606. During a release time 608, a pressure value 614 of the actuator may fluctuate due to the fluidic mass regulator's slow response of a fluidic mass regulator under constant pressure control until the actuator pressure returns to the constant or steady state level 606.

Referring to FIG. 7, returning the pressure of the actuator to the constant and/or steady state level 706 during a release time 708 may be faster under constant fluid mass control. The release time 708 for returning of the actuator pressure to the operational pressure value may be faster than the release time 608. In one example, the faster return to the operational pressure value may be due at least in part to the pressure of the fluid source being greater than the operational pressure value of the actuator. As demonstrated by the graph 600 and the graph 700, constant pressure control may provide a smaller dynamic range of haptic force feedback than constant fluid mass control. Because constant fluid mass control may involve trapping a constant mass of fluid inside the actuator, any squeezing and/or deforming of the actuator may result in a reduction in the actuator's volume and/or an increase in actuator pressure. This increase in the actuator pressure may provide and/or impart an increase in actuator impedance for a kinesthetic display, thereby potentially resulting in and/or leading to a wider range of impedance levels available to the kinesthetic display.

In one example, a user may deform an actuator to a certain degree during the time 704 in FIG. 7. During the time 704, the kinesthetic impedance of the actuator may increase to a peak level commensurate with the pressure value 712. This increase in the kinesthetic impedance of the actuator may be initiated in response to the user deforming the actuator to the certain degree. The kinesthetic impedance of the actuator may be maintained at the peak level for as long as the actuator remains deformed during the time 704.

In another example, a user may release an actuator, thereby terminating the deformation of the actuator during the time 708 in FIG. 7. During the time 708, the kinesthetic impedance of the actuator may decrease to a steady state level as a result of the actuator pressure returning to the steady state level 706. The kinesthetic impedance of the actuator may be maintained at the steady state level 706 for as long as the actuator remains undeformed during the time 708.

In some implementations, an actuator may be part of a haptic feedback system incorporated into a glove kinesthetic display. In such implementations, under constant pressure control, the kinesthetic impedance of the actuator may not change significantly as a finger of a user flexes. However, under constant pressure control, the kinesthetic impedance of the actuator may be unable to impart a realistic perception of object stiffness. In contrast, under constant fluid mass control, the kinesthetic impedance of the actuator may increase as a finger of the user flexes, thereby allowing the force feedback to create a realistic perception of object stiffness.

In addition, under constant fluid mass control, an increase in the kinesthetic impedance of the actuator may result from an interaction between the user and the actuator in a reactive or endogenous way (e.g., the user squeezes or otherwise deforms the actuator). In contrast, under constant pressure control, an inflated actuator may push on and/or against the user's finger, thereby providing active or exogenous interaction force feedback.

Moreover, under constant pressure control, the operational pressure level of an actuator may influence and/or control the pressure level of fluid supplied by a fluid source constantly to the actuator. Therefore, under constant pressure control, a higher actuator impedance may necessitate the use of a fluid source that generates higher pressure fluid. Under constant fluid mass control, the mass of fluid is trapped in the actuator. As such, the actuator pressure may be higher than the pressure level of the fluid source when the actuator is squeezed or deformed, thereby effectively reducing the pressure level requirement of the fluid source.

A quick response to the deformation of an actuator may help create low latency, believable interactions for a user in a virtual environment. In a haptic feedback system that controls the actuator using constant pressure control, an actuator with a large capacitance may have a slow response. However, in a haptic feedback system that controls an actuator using constant fluid mass control, the use of a higher pressure fluid to inflate the actuator may result in a decrease in the inflation time of the actuator to reach the actuator's operational pressure value. As such, an actuator with a large capacitance may have a faster response. The faster response may result from the fluid pressure being higher than an actuator operational pressure value because the amount of time that the fluid is provided to the actuator may be modulated.

As described herein, the features of a haptic feedback system that controls an actuator using constant fluid mass control may significantly improve the performance of soft fluidic actuators included in haptic kinesthetic displays for hands, wrists, or other parts of the human body. The improvements may provide more natural force feedback by offering a dynamic range of force feedback that is larger than that provided when constant control pressure is utilized. The improvements may provide more natural force feedback by eliminating any latency in the response of the haptic device when providing the force feedback.

In some embodiments, the term "haptic device," the term "haptic display," and the term "tactile display" may refer to an interface between a computer controlled device and a user that can provide feedback to the user representative of one or more tactile parameters of an object that may include, but are not limited to, size, shape, texture, roughness, smoothness, and temperature.

Figure 8:
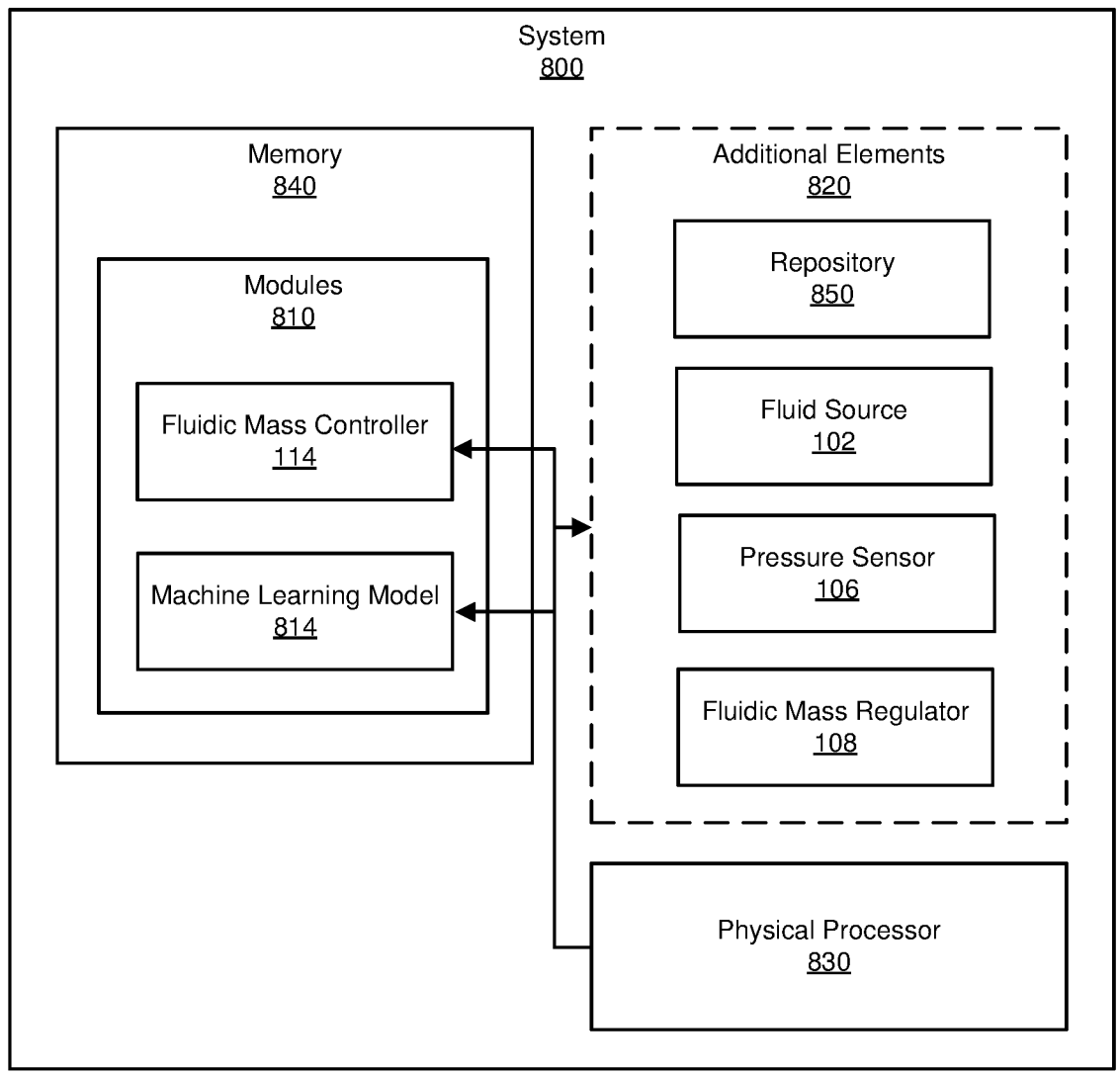
FIG. 8 is a block diagram of an example system that includes modules for use in a haptic feedback system.

FIG. 8 is a block diagram of an example system 800 that includes modules for use in a haptic feedback system. For example, referring also to FIG. 1, the system 800 may include the haptic feedback system 100. Modules 810 may include the fluidic mass controller 114 and/or a machine learning model 814. In one example, fluidic mass controller 114 may implement, execute, and/or coordinate with machine learning model 814. Although illustrated as separate modules in FIG. 8, fluidic mass controller 114 and machine learning model 814 may alternatively constitute and/or represent a single module and/or unit that facilitates controlling soft fluidic actuators with or without sensor feedback.

In some examples, machine learning model 814 may include and/or represent a neural network with backpropagation. In one example, machine learning model 814 may include and/or represent a feed-forward neural network that predicts inflation and/or deflation times without sensor feedback from a pressure sensor and without compensating for user-caused fluctuations in pressure between inflation-deflations sequences. In another example, machine learning model 814 may include and/or represent a feed-forward neural network that consumes and/or relies on sensor feedback from a pressure sensor coupled and/or placed between the actuator and the user's skin. In a further example, machine learning model 814 may include and/or represent a closed-loop neural network that predicts inflation and/or deflation times and also compensates for user-caused fluctuations in pressure.

In some implementations, one or more of the modules 810 may represent one or more software applications or programs that, when executed by a computing device, may cause the computing device to perform one or more tasks. As illustrated in FIG. 8, the example system 800 may also include one or more memory devices, such as memory 840. Memory 840 generally represents any type or form of volatile or non-volatile storage device or medium capable of storing data and/or computer-readable instructions. In one example, the memory 840 may store, load, and/or maintain one or more of modules 810. Examples of the memory 840 may include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 8, example system 800 may also include one or more physical processors, such as physical processor 830. The physical processor 830 generally represents any type or form of hardware-implemented processing unit capable of interpreting and/or executing computer-readable instructions. In one example, the physical processor 830 may access and/or modify one or more of the modules 810 stored in the memory 840. Additionally or alternatively, the physical processor 830 may execute one or more of the modules 810. Examples of the physical processor 830 may include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 8, the example system 800 may also include one or more additional elements 820. The additional elements 820 generally represent any type or form of hardware and/or software. The physical processor 830 may access and/or modify one or more of the additional elements 820. The additional elements 820 may include a repository 850, the fluidic mass regulator 108, the pressure sensor 106, and the fluid source 102. For example, the repository 850 may store information and/or data for use in implementing constant fluid mass control over the system 800.

A repository may be a storage device or medium that stores and/or manages data. In some implementations, a repository may be a database. A repository may be implemented using any type or form of volatile or non-volatile storage device(s) or medium(s) capable of storing data and/or computer-readable instructions. Examples of memory types and/or devices for use in an implementation of a repository may include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

In some examples, the exemplary system 800 may be implemented as a combination of a head-mounted display and a wearable. In such examples, the system 800 may implement and/or apply one or more machine learning algorithms and/or models (such as the machine learning model 814) to control the inflation and/or deflation of soft fluidic actuators. For example, the head-mounted display and/or the wearable may be programmed and/or configured with a fully and/or partially constructed machine learning model (such as a convolutional neural network and/or a recurrent neural network).

In some examples, the machine learning model may be trained and/or constructed with training data that includes various samples of input metrics, parameters, and/or measurements. In one example, the training data may be collected exclusively from the user operating the system 800. In another example, the training data may be pooled from a variety of users (including, e.g., the user operating system 800) across a vendor's customer base. Examples of such training data include, without limitation, inflation times for fluidic actuators, deflation times for fluidic actuators, pressure levels of fluid sources, starting pressures of fluidic actuators upon inflation or deflation, operating pressures of fluidic actuators at desired inflation or deflation, ending pressures of fluidic actuators upon inflation or deflation, combinations or variations of one or more of the same.

In a specific example, the machine learning model may be trained and/or constructed using a combination of three input parameters, namely the source pressure of the fluid source (e.g., an air tank), the desired inflation pressure of the fluidic actuator, and the inflation time for the fluidic actuator. Some samples may constitute positive data for the purpose of training the machine learning model. Other samples may constitute negative data for the purpose of training the machine learning model.

In some examples, one or more of these samples may be supplied by a pool of indiscriminate users whose data is collected by the manufacturer of the system 800 for the purpose of training the machine learning model. In one example, one or more of these samples may also be supplied by the end user donning and/or operating the system 800. For example, the user may calibrate and/or train the machine learning model 814 implemented on the system 800 to his or her level of sensitivity and/or strength. To do so, the user may perform one or more instances of a specific gesture and/or allow the wearable to apply certain pressures on his or her body and/or skin. The user may also be able to enter and/or provide feedback regarding the pressure levels applied by the wearable to the system 800.

Continuing with this example, the physical processor 830 may capture such feedback from the user and/or obtain feedback as pooled across the vendor's customer base. In this example, the physical processor 830 may then calibrate the machine learning model 814 to apply the appropriate amount of pressure to the user based at least in part on the feedback from the user and/or the feedback as pooled across the vendor's customer base.

Upon training and/or calibrating the machine learning model 814, the physical processor 830 may be able to classify and/or control pressure levels applied to the user via the machine learning model 814. Accordingly, the machine learning model 814 may be able to control and/or predict proper pressure levels to apply to the user via one or more soft fluidic actuators of the wearable. Such pressure levels may enable the wearable to communicate and/or impart certain physical sensations and/or simulations to the user by way of the soft fluidic actuators (especially in connection with an artificial reality experience). In this example, the physical processor 830 may analyze, classify, and/or control pressure levels applied to the user via machine learning model 814.

In some examples, the physical processor 830 may detect, via the machine learning model 814, that one or more soft fluidic actuators have been inflated and/or deflated to a desired pressure level at any given moment in the user's artificial reality experience. In response to this detection, the physical processor 830 may then direct the actuators to maintain and/or hold that pressure level for a certain amount of time before changing that pressure level to communicate and/or impart a different physical sensation and/or simulation to the user in connection with an artificial reality experience.

As a specific example, the machine learning model 814 may represent a convolutional neural network that includes various layers, such as one or more convolution layers, activation layers, pooling layers, and fully connected layers. In this example, the pressure sensor 106 may output pressure data over a certain period. The physical processor 830 may pass the pressure data through the convolutional neural network to determine whether to increase, decrease, and/or maintain the pressure level in conjunction with the user's artificial reality experience.

In the convolutional neural network, the pressure data may first encounter the convolution layer. At the convolution layer, the pressure data may be convolved using a filter and/or kernel. In particular, the convolution layer may cause the physical processor 830 to slide a matrix function window over and/or across the pressure data. The physical processor 830 may then record the resulting data convolved by the filter and/or kernel. In one example, one or more nodes included in the filter and/or kernel may be weighted by a certain magnitude and/or value.

After completion of the convolution layer, the convolved representation of the pressure data may encounter the activation layer. At the activation layer, the pressure data may be subjected to a non-linear activation function. In one example, the activation layer may cause the physical processor 830 to apply the non-linear activation function to the convolved data in the pressure data. By doing so, the physical processor 830 may be able to identify and/or learn certain non-linear patterns, correlations, and/or relationships between different regions of the convolved data in the pressure data.

In some examples, the physical processor 830 may apply one or more of these layers included in the convolutional neural network to the pressure data multiple times. As the electrical response completes all the layers, the convolutional neural network may render a classification for the pressure data. In one example, the classification may indicate that the pressure data is indicative of a certain sensation and/or simulation applied to the user. In another example, the classification may indicate that the pressure data is not indicative of such a sensation and/or simulation as of yet.

In some examples, the exemplary system 800 may implement a learning-based approach that relies on a neural network with backpropagation. In one example, such a learning-based approach may enable the system 800 to identify and/or learn certain errors and/or differences between expected inflation and/or deflation times and actual inflation and/or deflation times. By doing so, such a learning-based approach may enable system 800 to correct and/or compensate for those errors and/or differences in future inflation-deflation sequences, thereby achieving faster inflation and/or deflation times with higher accuracy and/or precision with respect to desired operating pressures. As a result, this learning-based approach may enable the system 800 to mitigate inflation and/or deflation overshoot or undershoot, which could otherwise impair the believability of the simulated effect provided by the actuator and/or the user's overall artificial reality experience.

In one example, the exemplary system 800 may include a two-valve setup in which one valve is configured to fill the actuator and the other valve is configured to drain the actuator. In this example, the two-valve setup may provide fast inflation and/or deflation times while also trapping and/or maintaining the fluid inside the actuator. Additionally or alternatively, the two-valve setup may facilitate analog control over the amount of fluid trapped inside the actuator to convey and/or impart different levels of stiffness to the user.

In some examples, the learning-based approach implemented by the system 800 may involve and/or include a feed-forward technique and/or feature. For example, in a feed-forward approach, the exemplary system 800 may train machine learning model 814 as a feed-forward neural network with backpropagation at various inflation source pressures and/or various deflation source pressures. By doing so, the system 800 may use the feed-forward neural network to determine the required valve timing (in connection with either the inflate valve or the deflate valve) for switching between two specific pressure levels. As a result, the system 800 may be able to achieve and/or provide fast response times with fairly high accuracy and/or minimal hardware requirements. Additionally and/or alternatively, with this feed-forward approach, system the 800 may be able to achieve and/or provide fast analog pressure-based control and/or fast analog constant fluidic mass control. In one embodiment, this feed-forward approach may avoid compensating for user-caused fluctuations in pressure between inflation-deflations sequences.

In some examples, to overcome drifting errors and/or user-created changes in pressure, the system 800 may incorporate and/or rely on the pressure sensor 106 to form and/or facilitate a feed-forward control strategy with sensor feedback. From the pressure sensor 106, the system 800 may be able to determine the starting pressure of the actuator. With this starting pressure of the actuator, the system 800 may use the same open-loop neural network approach to predict the required open times to fill and/or inflate the actuator to the desired operating pressure. By doing so, the system 800 may be able to determine and/or obtain appropriate inflation and/or deflation times faster in analogue constant mass control regulators than in analogue pressure regulators.

In one example, the system 800 may be able to reconcile and/or resolve any errors and/or differences between the predicted final pressure and the actual final pressure in the next inflation-deflation sequence. In this example, the system 800 may avoid and/or mitigate error accumulation and/or unaccounted changes in pressure due to the interaction between the fluidic actuator and the user. By doing so, the system 800 may reduce the need for adjustments between inflation-deflation sequences, thereby enabling the fluid to remain trapped and/or increasing the available actuator bandwidth. Accordingly, the system 800 may use such a feed-forward approach with sensor feedback to achieve accurate analog constant mass control without necessarily compensating for user-caused fluctuations in pressure between inflation-deflations sequences.

In one example, the system 800 may implement a closed-loop approach by constantly adjusting the fluid levels inside the actuator to reach the desired pressure for any given moment. In this example, similar to the feed-forward approach with sensor feedback, the closed-loop approach may enable the system 800 to predict inflation and/or deflation times for the neural network model to maximize and/or optimize the inflation and/or deflation speeds. However, when implementing the closed-loop approach, the system 800 may make certain adjustments to the fluid levels inside the actuator to compensate for user-caused fluctuations in pressure between inflation-deflation sequences and thus ensure constant pressure despite such user-caused fluctuations. Such fluctuations in the pressure levels may be caused by the user deforming the actuator (e.g., between inflation-deflation sequences). Accordingly, the system 800 may use such a closed-loop approach to achieve accurate analog pressure-based control.

In some examples, the system 800 may update the machine learning model 814 based on changes in the fluid levels inside the actuator. For example, as the user deforms the actuator, the pressure sensor 106 may provide feedback that indicates varying pressure levels relative to the actuator even though the amount of fluid trapped in the actuator is supposed to remain constant. In this example, to compensate for the varying pressure levels due to the user's deformations of the actuator, the system 800 may update the machine learning model 814 to anticipate such deformations and/or to compensate for such deformations very quickly in order to maintain constant pressure and/or mass control relative to the actuator.

Figure 9:
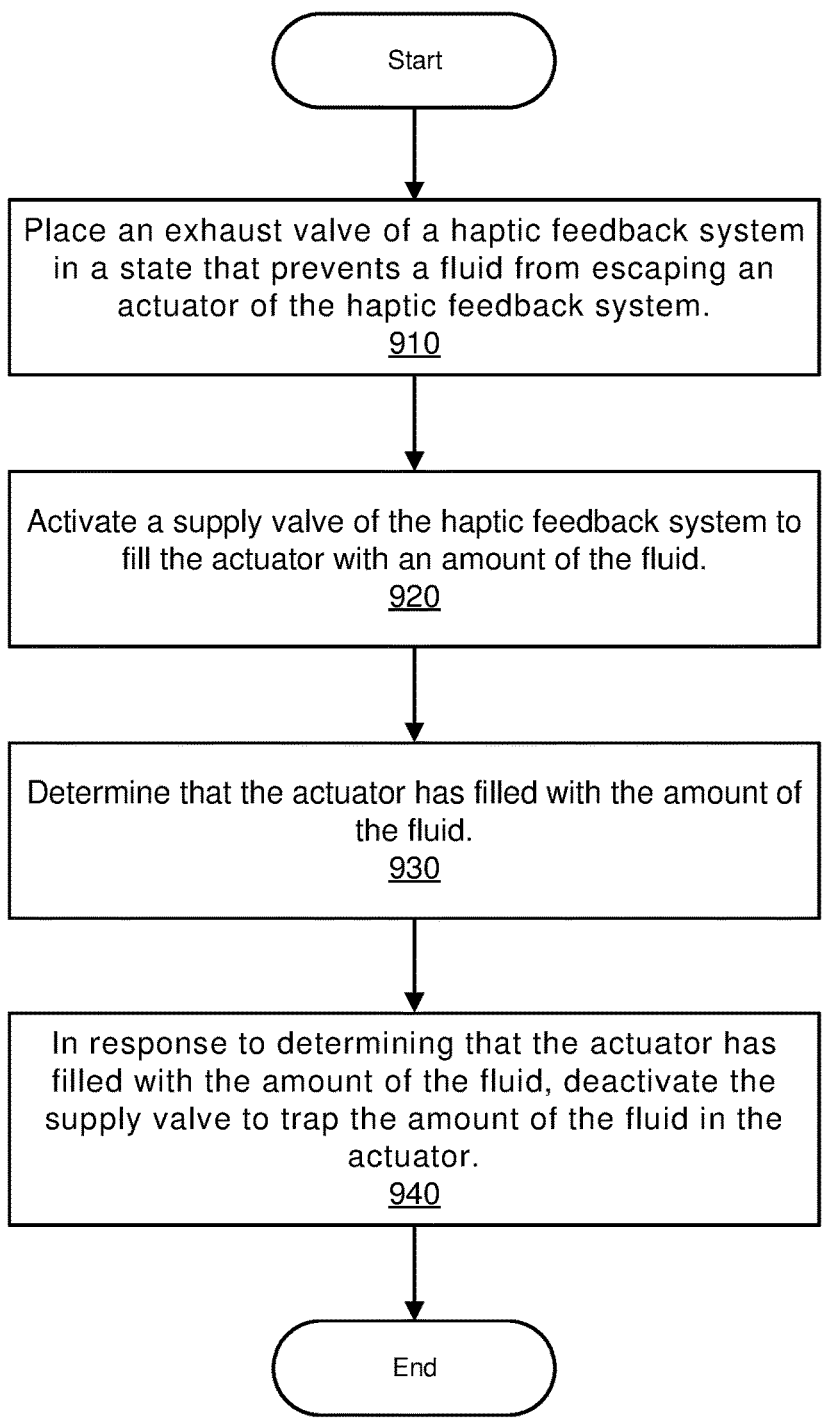
FIG. 9 is a flow diagram of an exemplary method for performing constant fluid mass control of an actuator.

FIG. 9 is a flow diagram of an exemplary computer-implemented method 900 for performing constant fluid mass control of an actuator. The steps shown in FIG. 9 may be performed by any suitable computer-executable code and/or computing system, including the system(s) illustrated in FIGS. 1 and 8. In one example, each of the steps shown in FIG. 9 may represent an algorithm whose structure includes and/or is represented by multiple sub-steps, examples of which will be provided in greater detail below.

As illustrated in FIG. 9, at step 910 one or more of the systems described herein may place an exhaust valve of a haptic feedback system in a state that prevents a fluid from escaping an actuator of the haptic feedback system. For example, referring to FIG. 3, the fluidic mass regulator 308 may place the exhaust valve 312 in an OFF state to prevent fluid from escaping the actuator 104. In another example, referring to FIG. 4, the fluidic mass regulator 408 may place the exhaust valve 412 in an ON state to prevent fluid from escaping the actuator 104.

In some embodiments, the term "actuator" may refer to a device that acts as a transducer from an input energy source into mechanical energy that displaces (strains) or forces (stresses) the device. The strain or stress on the device may exert a force on a human body (e.g., the skin of a user) stimulating a tactile sense. Examples of actuators include, without limitation, fluid-driven actuators or soft fluidic actuators. An actuator may use fluid to transfer energy from a source. This transfer of the energy may be provided by changing an internal pressure, volume, or mass of the fluid within the actuator.

In some embodiments, the term "fluid" may refer to a substance without a fixed shape. A fluid may deform in response to an applied force. Examples of fluids may include, without limitation, liquids, gasses, and plasmas. A fluid used in implementations of the haptic feedback systems described herein may be a compressed fluid (e.g., compressed air) with low viscosity.

The systems described herein may perform step 910 in a variety of ways. In one example, the fluidic mass controller 114 may provide the fluidic mass regulator 108 with information and/or data for controlling the state of the one or more valves included in the fluidic mass regulator 108. For example, the fluidic mass controller 114 may deliver a control signal to the exhaust valve 312 in FIG. 3 and/or the exhaust valve 412 in FIG. 4. In this example, the control signal may cause the corresponding exhaust valve to deactivate and/or close such that fluid is unable to escape and/or exit the actuator.

As illustrated in FIG. 9, at step 920 one or more of the systems described herein may activate a supply valve of the haptic feedback system to fill the actuator with an amount of the fluid. For example, referring to FIG. 3, the fluidic mass regulator 308 may place the supply valve 310 in an ON state to inflate the actuator 104 by filling the actuator 104 with an amount of fluid supplied by the fluid source 102. In another example, referring to FIG. 4, the fluidic mass regulator 408 may place the supply valve 410 in an ON state to inflate the actuator 104 by filling the actuator 104 with an amount of fluid supplied by the fluid source 102.

In some embodiments, the term "activate," when used to describe an operation of a valve, may refer to making the valve active or operative. Referring to FIG. 3, activating a two-way valve may energize the valve to connect and/or open an inlet port of the valve (e.g., the supply valve inlet port 314) to an outlet port of the valve (e.g., the supply valve outlet port 316). Referring to FIG. 4, activating a three-way valve may energize the valve such that a first port of the valve (e.g., the supply valve first port 414) is connected and/or opened to a second port of the valve (e.g., the supply valve second port 416).

The systems described herein may perform step 920 in a variety of ways. In one example, the fluidic mass controller 114 may deliver a control signal to the supply valve 310 in FIG. 3 and/or the supply valve 410 in FIG. 4. In this example, the control signal may cause the corresponding supply valve to activate and/or open such that fluid is able to fill the actuator.

As illustrated in FIG. 9, at step 930 one or more of the systems described herein may determine that the actuator has filled with the amount of the fluid. For example, referring to FIG. 1, the fluidic mass controller 114 may determine that the actuator 104 is inflated to a desired pressure based at least in part on measurement data received from the pressure sensor 106. In another example, the fluidic mass controller 114 may determine that the actuator 104 is inflated to a desired pressure based at least in part on the known amount of time needed to fill the actuator 104 to that pressure level.

The systems described herein may perform step 930 in a variety of ways. In some implementations, the pressure sensor 106 may sense and/or measure the current pressure level of the actuator 104. The pressure sensor 106 may provide the measurements of the sensed pressure of the actuator 104 to the fluidic mass controller 114. The fluidic mass controller 114 may then determine that the sensed pressure of the actuator 104 is approximately equal to the desired inflated pressure of the actuator 104 based at least in part on those measurements.

In other implementations, the fluidic mass controller 114 may be programmed to achieve the desired pressure by filling the actuator 104 with fluid for a specific amount of time. For example, to achieve the operational pressure level of the actuator 104, the fluidic mass controller 114 may place the supply and exhaust valves in certain states for a known amount of time. In this example, once the valves have remained in those states for that amount of time, the fluidic mass controller 114 may determine that the actuator 104 has filled with the proper amount of fluid.

As illustrated in FIG. 9, at step 940 one or more of the systems described herein may deactivate the supply valve to trap the amount of the fluid in the actuator in response to determining that the actuator has filled with the amount of the fluid. For example, referring to FIG. 3, the fluidic mass regulator 308 may place the supply valve 310 in an OFF state to stop the fluid source 102 from supplying fluid to the actuator 104. Because, in this example, the exhaust valve 312 prevents fluid from escaping the actuator 104, the amount of fluid in the actuator 104 at the time that the supply valve 310 enters the OFF state may be trapped in the actuator 104.

As another example, referring to FIG. 4, the fluidic mass regulator 408 may place the supply valve 410 in an OFF state to stop the fluid source 102 from supplying fluid to the actuator 104. Because, in this example, the exhaust valve 412 prevents fluid from escaping the actuator 104, the amount of fluid in the actuator 104 at the time that the supply valve 410 enters the OFF state may be trapped in the actuator 104.

In some embodiments, the term "trap" may refer holding, maintaining, retaining, and/or catching fluid in an object (such as an actuator) or enclosure. Put differently, the term "trap" may refer to not allowing the fluid to exit and/or escape to the object or enclosure. Accordingly, when trapped in the actuator, the fluid may be held and maintained within the actuator and not allowed to escape or be exhausted from the actuator.

The systems described herein may perform step 940 in a variety of ways. In one example, the fluidic mass controller 114 may deactivate and/or close the supply valve to trap the amount of the fluid in the actuator 104. In this example, the fluidic mass controller 114 may initiate the deactivation and/or closure of the supply valve in response to the determination that the actuator 104 has filled with the proper amount of fluid.

A haptic device may include a haptic feedback system including two fluidic valves interfaced to an actuator for implementing a pneumatic solution that provides force feedback detectable to a user. A first fluidic valve may be connected to a fluid source for filling the actuator. A second fluidic valve may include and/or incorporate an exhaust port for draining the actuator. In some implementations, the fluidic valves may be two-way valves. In other implementations, the fluidic valves may be three-way valves.

The haptic feedback system may implement the use of constant fluid mass control using the two fluidic valves. The haptic feedback system may use the two fluidic valves to trap a constant mass of fluid (e.g., air, water, etc.) inside the actuator during actuation, as opposed to maintaining the fluid at a constant pressure during actuation. The ability to trap a constant mass of fluid in the actuator may allow for faster and more precise changes in the control of the fluid mass, thereby resulting in a large dynamic feedback range and reduced response latency for the force feedback. This large dynamic feedback range and reduced response latency may lead and/or contribute to more natural, believable touch sensations for a user operating the haptic feedback system.

Example Embodiments

Example 1: A haptic feedback system may include an actuator, a supply valve coupled to the actuator, an exhaust valve, and a fluidic mass controller communicatively coupled to the supply valve and the exhaust valve. The fluidic mass controller may place the exhaust valve in a state that prevents a fluid from escaping the actuator, activate the supply valve to fill the actuator with an amount of the fluid, determine that the actuator has filled with the amount of the fluid, and in response to determining that the actuator has filled with the amount of the fluid, deactivate the supply valve to trap the amount of the fluid in the actuator.

Example 2: The haptic feedback system of Example 1, further including a pressure sensor. The fluidic mass controller may receive, from the pressure sensor, data indicative of an amount of pressure sensed in connection with the actuator, and may determine, based at least in part on the data received from the pressure sensor, that the actuator has filled with the amount of the fluid.

Example 3: The haptic feedback system of any of Examples 1 and 2, where the actuator may have a kinesthetic impedance that changes commensurate with a deformation of the actuator.

Example 4: The haptic feedback system of any of Examples 1-3, where the actuator may be deformed to a certain degree, a kinesthetic impedance of the actuator may increase to a peak level in response to the actuator being deformed to the certain degree, and the kinesthetic impedance of the actuator may be maintained at the peak level for as long as the actuator remains deformed to the certain degree.

Example 5: The haptic feedback system of any of Examples 1-4, where the kinesthetic impedance of the actuator may decrease to a steady state level upon termination of the deformation of the actuator, and the kinesthetic impedance of the actuator may be maintained at the steady state level for as long as the actuator remains undeformed.

Example 6: The haptic feedback system of any of Examples 1-5, further including a fluid source coupled to a first port of the supply valve, and where the actuator may be coupled to a second port of the supply valve.

Example 7: The haptic feedback system of any of Examples 1-6, where the supply valve may be a two-way valve, the exhaust valve may be a two-way valve, and the actuator may be further coupled to a first port of the exhaust valve.

Example 8: The haptic feedback system of any of Examples 1-6, where the supply valve may be a three-way valve, the exhaust valve may be a three-way valve, a third port of the supply valve may be coupled to a first port of the exhaust valve, and a second port of the exhaust valve may be blocked.

Example 9: The haptic feedback system of any of Examples 1-8, where the fluidic mass controller may further place the exhaust valve in another state that allows the fluid to escape from the actuator.

Example 10: The haptic feedback system of any of Examples 1-9, where the fluid may be compressed air.

Example 11: A computer-implemented method may include placing an exhaust valve of a haptic feedback system in a state that prevents a fluid from escaping an actuator of the haptic feedback system, activating a supply valve of the haptic feedback system to fill the actuator with an amount of the fluid, determining that the actuator has filled with the amount of the fluid, and in response to determining that the actuator has filled with the amount of the fluid, deactivating the supply valve to trap the amount of the fluid in the actuator.

Example 12: The computer-implemented method of Example 11, where the method further comprises receiving data indicative of an amount of pressure sensed in connection with the actuator, and determining the actuator has filled with the amount of the fluid may be based at least in part on the received data.

Example 13: The computer-implemented method of any of Examples 11 and 12, where the actuator has a kinesthetic impedance that changes commensurate with a deformation of the actuator.

Example 14: The computer-implemented method of any of Examples 11-13, where the actuator may be deformed to a certain degree, a kinesthetic impedance of the actuator may increase to a peak level in response to the actuator being deformed to the certain degree, and the kinesthetic impedance of the actuator may be maintained at the peak level for as long as the actuator remains deformed to the certain degree.

Example 15: The computer-implemented method of any of Examples 11-14, where the kinesthetic impedance of the actuator may decrease to a steady state level upon termination of the deformation of the actuator, and the kinesthetic impedance of the actuator may be maintained at the steady state level for as long as the actuator remains undeformed.

Example 16: The computer-implemented method of any of Examples 11-15, where activating the supply valve may include placing the supply valve in an ON state, and deactivating the supply valve may include placing the supply valve in an OFF state.

Example 17: The computer-implemented method of any of Examples 11-16, where the supply valve may be a two-way valve, the exhaust valve may be a two-way valve, placing the exhaust valve in a state that prevents the fluid from escaping the actuator may include placing the exhaust valve in an OFF state, and the method may further include placing the exhaust valve in an ON state to exhaust fluid from the actuator while the supply valve remains deactivated.

Example 18: The computer-implemented method of any of Examples 11-17, where the supply valve may be a three-way valve, the exhaust valve may be a three-way valve, placing the exhaust valve in a state that prevents the fluid from escaping the actuator may include placing the exhaust valve in an ON state, and the method may further include placing the exhaust valve in an OFF state to exhaust fluid from the actuator while the supply valve remains deactivated.

Example 19: An artificial reality system may include a head-mounted display dimensioned to be worn by a user of the artificial reality system, and a haptic feedback system communicatively coupled to the head-mounted display, wherein the haptic feedback system may include an actuator, a supply valve coupled to the actuator; an exhaust valve, and a fluidic mass controller communicatively coupled to the supply valve and the exhaust valve, wherein the fluidic mass controller places the exhaust valve in a state that prevents a fluid from escaping the actuator, activates the supply valve to fill the actuator with an amount of the fluid, determines that the actuator has filled with the amount of the fluid, and in response to determining that the actuator has filled with the amount of the fluid, deactivates the supply valve to trap the amount of the fluid in the actuator.

Example 20: The artificial reality system of Example 19, where the haptic feedback system may further include a pressure sensor, and the fluidic mass controller may receive, from the pressure sensor, data indicative of an amount of pressure sensed in connection with the actuator, and may determine, based at least in part on the data received from the pressure sensor, that the actuator has filled with the amount of the fluid.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to regulate the pressure level of an actuator, use the result of the transformation to regulate the pressure level of the actuator, and store the result of the transformation to for future reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1100 in FIG. 11) or that visually immerses a user in an artificial reality (such as, e.g., virtual-reality system 1200 in FIG. 12). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 11:
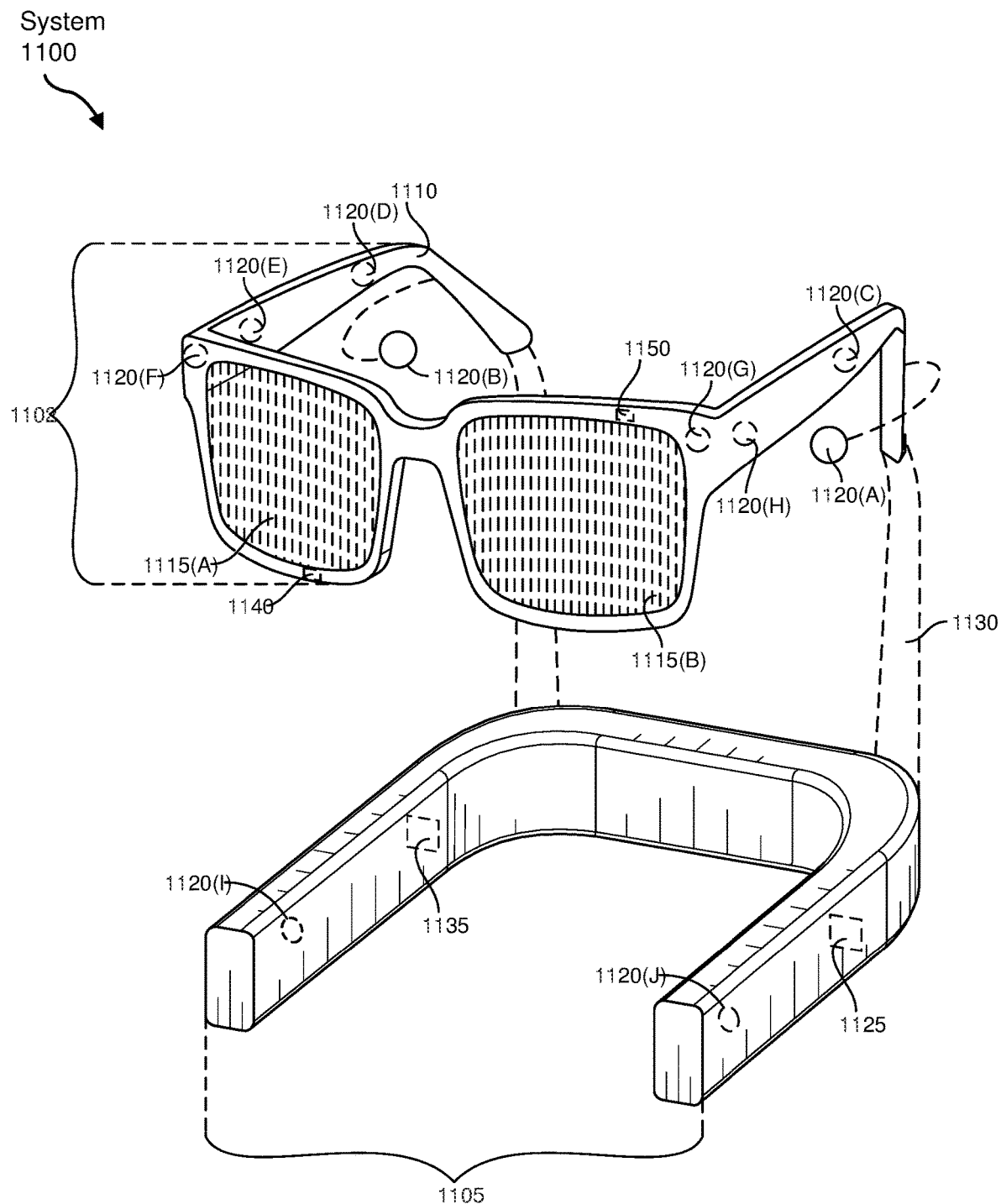
FIG. 11 is an illustration of exemplary augmented-reality glasses that may be used in connection with embodiments of this disclosure.

Turning to FIG. 11, augmented-reality system 1100 may include an eyewear device 1102 with a frame 1110 configured to hold a left display device 1115(A) and a right display device 1115(B) in front of a user's eyes. Display devices 1115(A) and 1115(B) may act together or independently to present an image or series of images to a user. While augmented-reality system 1100 includes two displays, embodiments of this disclosure may be implemented in augmented-reality systems with a single NED or more than two NEDs.

In some embodiments, augmented-reality system 1100 may include one or more sensors, such as sensor 1140. Sensor 1140 may generate measurement signals in response to motion of augmented-reality system 1100 and may be located on substantially any portion of frame 1110. Sensor 1140 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1100 may or may not include sensor 1140 or may include more than one sensor. In embodiments in which sensor 1140 includes an IMU, the IMU may generate calibration data based on measurement signals from sensor 1140. Examples of sensor 1140 may include, without limitation, accelerometers, gyroscopes, magnetometers, other suitable types of sensors that detect motion, sensors used for error correction of the IMU, or some combination thereof.

In some examples, augmented-reality system 1100 may also include a microphone array with a plurality of acoustic transducers 1120(A)-1120(J), referred to collectively as acoustic transducers 1120. Acoustic transducers 1120 may represent transducers that detect air pressure variations induced by sound waves. Each acoustic transducer 1120 may be configured to detect sound and convert the detected sound into an electronic format (e.g., an analog or digital format). The microphone array in FIG. 12 may include, for example, ten acoustic transducers: 1120(A) and 1120(B), which may be designed to be placed inside a corresponding ear of the user, acoustic transducers 1120(C), 1120(D), 1120(E), 1120(F), 1120(G), and 1120(H), which may be positioned at various locations on frame 1110, and/or acoustic transducers 1120(I) and 1120(J), which may be positioned on a corresponding neckband 1105.

In some embodiments, one or more of acoustic transducers 1120(A)-(F) may be used as output transducers (e.g., speakers). For example, acoustic transducers 1120(A) and/or 1120(B) may be earbuds or any other suitable type of headphone or speaker.

The configuration of acoustic transducers 1120 of the microphone array may vary. While augmented-reality system 1100 is shown in FIG. 11 as having ten acoustic transducers 1120, the number of acoustic transducers 1120 may be greater or less than ten. In some embodiments, using higher numbers of acoustic transducers 1120 may increase the amount of audio information collected and/or the sensitivity and accuracy of the audio information. In contrast, using a lower number of acoustic transducers 1120 may decrease the computing power required by an associated controller 1150 to process the collected audio information. In addition, the position of each acoustic transducer 1120 of the microphone array may vary. For example, the position of an acoustic transducer 1120 may include a defined position on the user, a defined coordinate on frame 1110, an orientation associated with each acoustic transducer 1120, or some combination thereof.

Acoustic transducers 1120(A) and 1120(B) may be positioned on different parts of the user's ear, such as behind the pinna, behind the tragus, and/or within the auricle or fossa. Or, there may be additional acoustic transducers 1120 on or surrounding the ear in addition to acoustic transducers 1120 inside the ear canal. Having an acoustic transducer 1120 positioned next to an ear canal of a user may enable the microphone array to collect information on how sounds arrive at the ear canal. By positioning at least two of acoustic transducers 1120 on either side of a user's head (e.g., as binaural microphones), augmented-reality device 1100 may simulate binaural hearing and capture a 3D stereo sound field around about a user's head. In some embodiments, acoustic transducers 1120(A) and 1120(B) may be connected to augmented-reality system 1100 via a wired connection 1130, and in other embodiments acoustic transducers 1120(A) and 1120(B) may be connected to augmented-reality system 1100 via a wireless connection (e.g., a Bluetooth connection). In still other embodiments, acoustic transducers 1120(A) and 1120(B) may not be used at all in conjunction with augmented-reality system 1100.

Acoustic transducers 1120 on frame 1110 may be positioned in a variety of different ways, including along the length of the temples, across the bridge, above or below display devices 1115(A) and 1115(B), or some combination thereof. Acoustic transducers 1120 may also be oriented such that the microphone array is able to detect sounds in a wide range of directions surrounding the user wearing the augmented-reality system 1100. In some embodiments, an optimization process may be performed during manufacturing of augmented-reality system 1100 to determine relative positioning of each acoustic transducer 1120 in the microphone array.

In some examples, augmented-reality system 1100 may include or be connected to an external device (e.g., a paired device), such as neckband 1105. Neckband 1105 generally represents any type or form of paired device. Thus, the following discussion of neckband 1105 may also apply to various other paired devices, such as charging cases, smart watches, smart phones, wrist bands, other wearable devices, hand-held controllers, tablet computers, laptop computers, other external compute devices, etc.

As shown, neckband 1105 may be coupled to eyewear device 1102 via one or more connectors. The connectors may be wired or wireless and may include electrical and/or non-electrical (e.g., structural) components. In some cases, eyewear device 1102 and neckband 1105 may operate independently without any wired or wireless connection between them. While FIG. 11 illustrates the components of eyewear device 1102 and neckband 1105 in example locations on eyewear device 1102 and neckband 1105, the components may be located elsewhere and/or distributed differently on eyewear device 1102 and/or neckband 1105. In some embodiments, the components of eyewear device 1102 and neckband 1105 may be located on one or more additional peripheral devices paired with eyewear device 1102, neckband 1105, or some combination thereof.

Pairing external devices, such as neckband 1105, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1100 may be provided by a paired device or shared between a paired device and an eyewear device, thus reducing the weight, heat profile, and form factor of the eyewear device overall while still retaining desired functionality. For example, neckband 1105 may allow components that would otherwise be included on an eyewear device to be included in neckband 1105 since users may tolerate a heavier weight load on their shoulders than they would tolerate on their heads. Neckband 1105 may also have a larger surface area over which to diffuse and disperse heat to the ambient environment. Thus, neckband 1105 may allow for greater battery and computation capacity than might otherwise have been possible on a stand-alone eyewear device. Since weight carried in neckband 1105 may be less invasive to a user than weight carried in eyewear device 1102, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1105 may be communicatively coupled with eyewear device 1102 and/or to other devices. These other devices may provide certain functions (e.g., tracking, localizing, depth mapping, processing, storage, etc.) to augmented-reality system 1100. In the embodiment of FIG. 11, neckband 1105 may include two acoustic transducers (e.g., 1120(I) and 1120(J)) that are part of the microphone array (or potentially form their own microphone subarray). Neckband 1105 may also include a controller 1125 and a power source 1135.

Acoustic transducers 1120(I) and 1120(J) of neckband 1105 may be configured to detect sound and convert the detected sound into an electronic format (analog or digital). In the embodiment of FIG. 11, acoustic transducers 1120(I) and 1120(J) may be positioned on neckband 1105, thereby increasing the distance between the neckband acoustic transducers 1120(I) and 1120(J) and other acoustic transducers 1120 positioned on eyewear device 1102. In some cases, increasing the distance between acoustic transducers 1120 of the microphone array may improve the accuracy of beamforming performed via the microphone array. For example, if a sound is detected by acoustic transducers 1120(C) and 1120(D) and the distance between acoustic transducers 1120(C) and 1120(D) is greater than, e.g., the distance between acoustic transducers 1120(D) and 1120(E), the determined source location of the detected sound may be more accurate than if the sound had been detected by acoustic transducers 1120(D) and 1120(E).

Controller 1125 of neckband 1105 may process information generated by the sensors on neckband 1105 and/or augmented-reality system 1100. For example, controller 1125 may process information from the microphone array that describes sounds detected by the microphone array. For each detected sound, controller 1125 may perform a direction-of-arrival (DOA) estimation to estimate a direction from which the detected sound arrived at the microphone array. As the microphone array detects sounds, controller 1125 may populate an audio data set with the information. In embodiments in which augmented-reality system 1100 includes an inertial measurement unit, controller 1125 may compute all inertial and spatial calculations from the IMU located on eyewear device 1102. A connector may convey information between augmented-reality system 1100 and neckband 1105 and between augmented-reality system 1100 and controller 1125. The information may be in the form of optical data, electrical data, wireless data, or any other transmittable data form. Moving the processing of information generated by augmented-reality system 1100 to neckband 1105 may reduce weight and heat in eyewear device 1102, making it more comfortable to the user.

Power source 1135 in neckband 1105 may provide power to eyewear device 1102 and/or to neckband 1105. Power source 1135 may include, without limitation, lithium ion batteries, lithium-polymer batteries, primary lithium batteries, alkaline batteries, or any other form of power storage. In some cases, power source 1135 may be a wired power source. Including power source 1135 on neckband 1105 instead of on eyewear device 1102 may help better distribute the weight and heat generated by power source 1135.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1200 in FIG. 12, that mostly or completely covers a user's field of view. Virtual-reality system 1200 may include a front rigid body 1202 and a band 1204 shaped to fit around a user's head. Virtual-reality system 1200 may also include output audio transducers 1206(A) and 1206(B). Furthermore, while not shown in FIG. 12, front rigid body 1202 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1100 and/or virtual-reality system 1200 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 1100 and/or virtual-reality system 1200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1100 and/or virtual-reality system 1200 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 1100 and 1200 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 13:
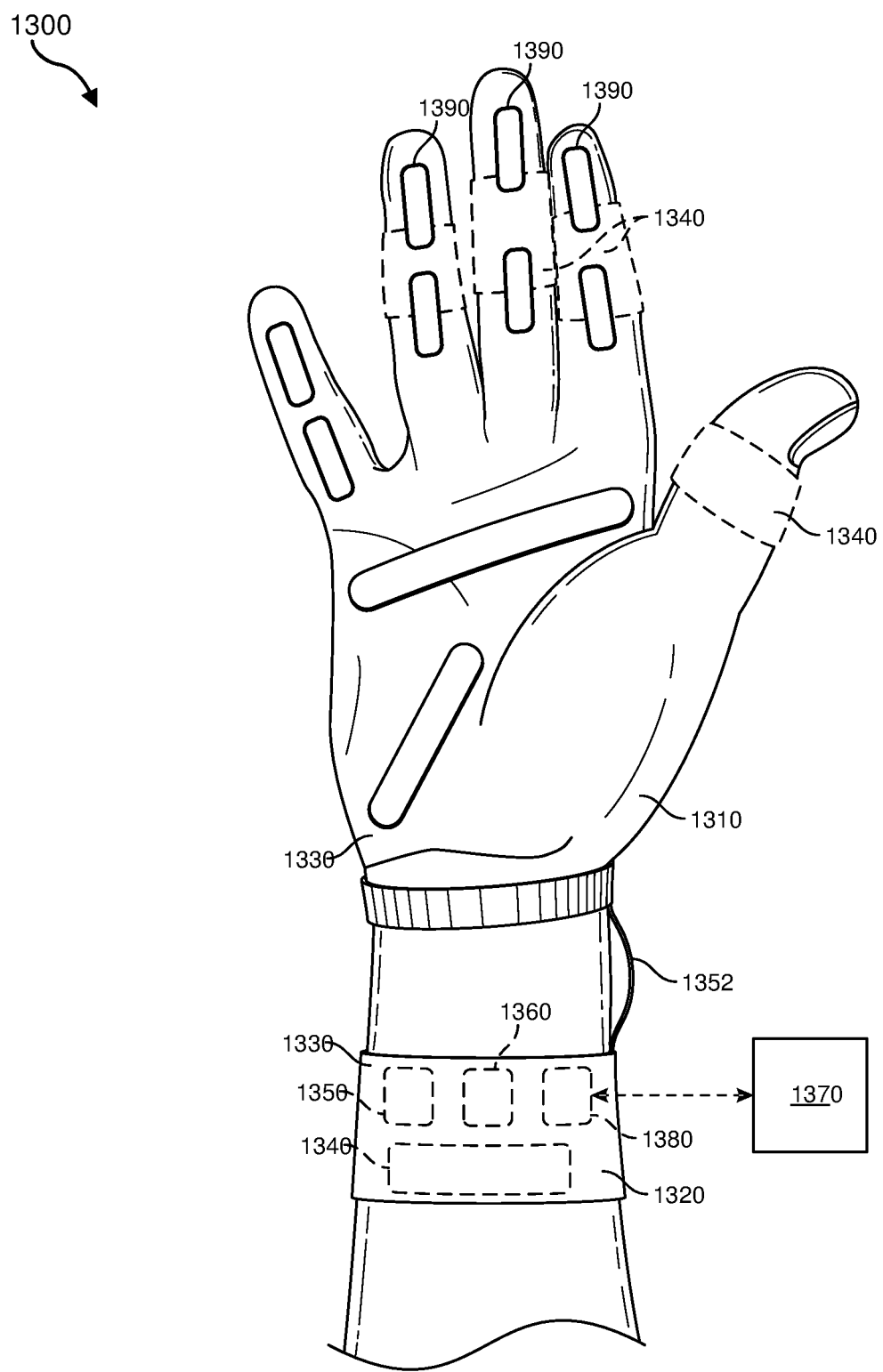
FIG. 13 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 13 illustrates a vibrotactile system 1300 in the form of a wearable glove (haptic device 1310) and wristband (haptic device 1320). Haptic device 1310 and haptic device 1320 are shown as examples of wearable devices that include a flexible, wearable textile material 1330 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1340 may be positioned at least partially within one or more corresponding pockets formed in textile material 1330 of vibrotactile system 1300. Vibrotactile devices 1340 may be positioned in locations to provide a vibrating sensation (e.g., haptic feedback) to a user of vibrotactile system 1300. For example, vibrotactile devices 1340 may be positioned against the user's finger(s), thumb, or wrist, as shown in FIG. 13. Vibrotactile devices 1340 may, in some examples, be sufficiently flexible to conform to or bend with the user's corresponding body part(s).

A power source 1350 (e.g., a battery) for applying a voltage to the vibrotactile devices 1340 for activation thereof may be electrically coupled to vibrotactile devices 1340, such as via conductive wiring 1352. In some examples, each of vibrotactile devices 1340 may be independently electrically coupled to power source 1350 for individual activation. In some embodiments, a processor 1360 may be operatively coupled to power source 1350 and configured (e.g., programmed) to control activation of vibrotactile devices 1340.

Vibrotactile system 1300 may be implemented in a variety of ways. In some examples, vibrotactile system 1300 may be a standalone system with integral subsystems and components for operation independent of other devices and systems. As another example, vibrotactile system 1300 may be configured for interaction with another device or system 1370. For example, vibrotactile system 1300 may, in some examples, include a communications interface 1380 for receiving and/or sending signals to the other device or system 1370. The other device or system 1370 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1380 may enable communications between vibrotactile system 1300 and the other device or system 1370 via a wireless (e.g., Wi-Fi, Bluetooth, cellular, radio, etc.) link or a wired link. If present, communications interface 1380 may be in communication with processor 1360, such as to provide a signal to processor 1360 to activate or deactivate one or more of the vibrotactile devices 1340.

Vibrotactile system 1300 may optionally include other subsystems and components, such as touch-sensitive pads 1390, pressure sensors, motion sensors, position sensors, lighting elements, and/or user interface elements (e.g., an on/off button, a vibration control element, etc.). During use, vibrotactile devices 1340 may be configured to be activated for a variety of different reasons, such as in response to the user's interaction with user interface elements, a signal from the motion or position sensors, a signal from the touch-sensitive pads 1390, a signal from the pressure sensors, a signal from the other device or system 1370, etc.

Although power source 1350, processor 1360, and communications interface 1380 are illustrated in FIG. 13 as being positioned in haptic device 1320, the present disclosure is not so limited. For example, one or more of power source 1350, processor 1360, or communications interface 1380 may be positioned within haptic device 1310 or within another wearable textile.

Figure 14:
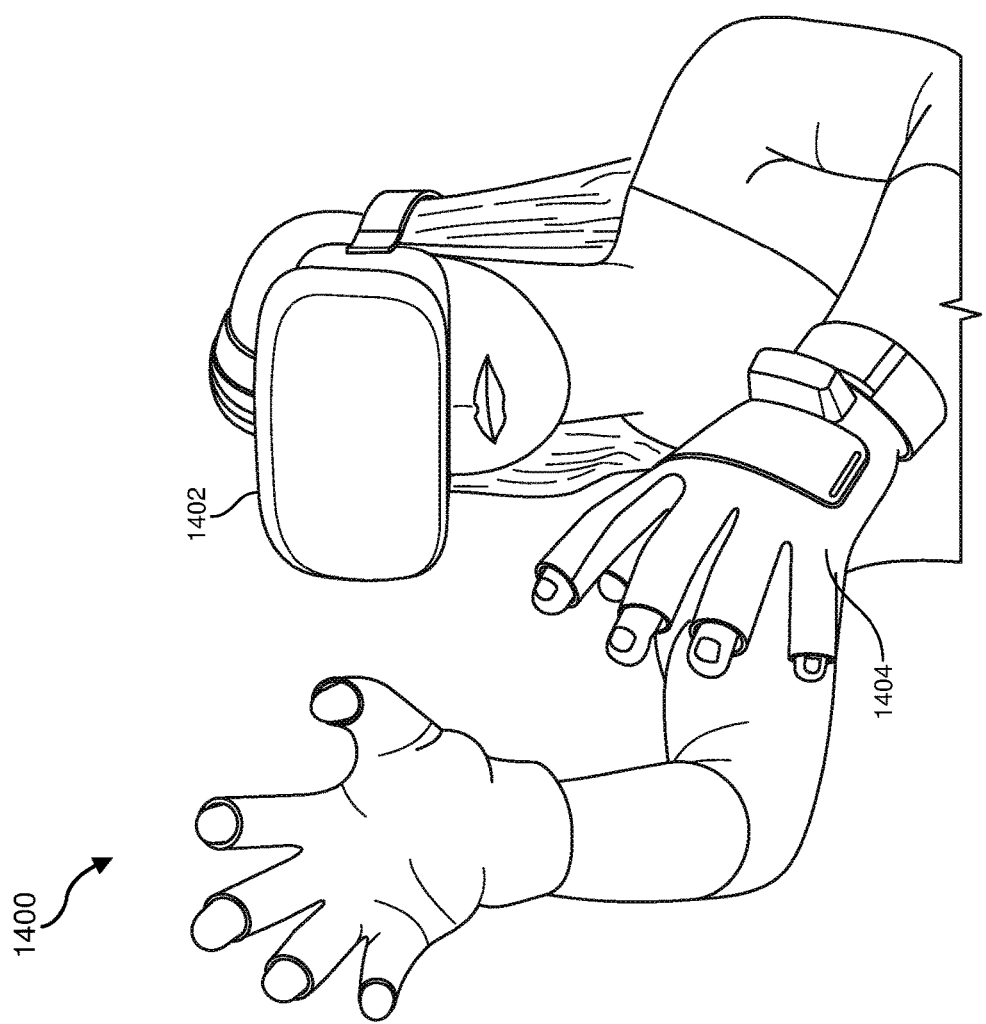
FIG. 14 is an illustration of an exemplary virtual-reality environment according to embodiments of this disclosure.

Haptic wearables, such as those shown in and described in connection with FIG. 13, may be implemented in a variety of types of artificial-reality systems and environments. FIG. 14 shows an example artificial-reality environment 1400 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 12:
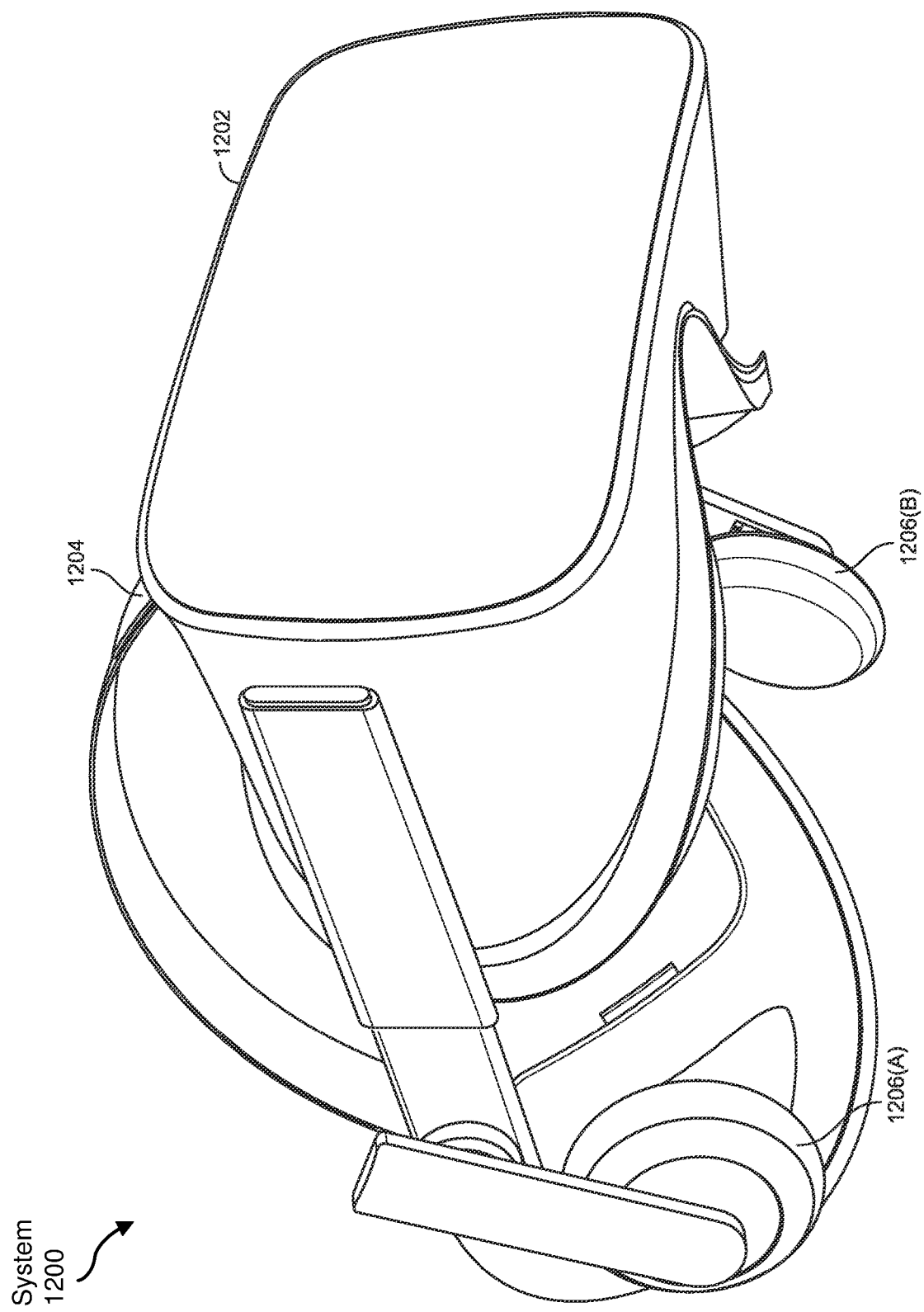
FIG. 12 is an illustration of an exemplary virtual-reality headset that may be used in connection with embodiments of this disclosure.

Head-mounted display 1402 generally represents any type or form of virtual-reality system, such as virtual-reality system 1200 in FIG. 12. Haptic device 1404 generally represents any type or form of wearable device, worn by a user of an artificial-reality system, that provides haptic feedback to the user to give the user the perception that he or she is physically engaging with a virtual object. In some embodiments, haptic device 1404 may provide haptic feedback by applying vibration, motion, and/or force to the user. For example, haptic device 1404 may limit or augment a user's movement. To give a specific example, haptic device 1404 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1404 to send action requests to a console. Examples of action requests include, without limitation, requests to start an application and/or end the application and/or requests to perform a particular action within the application.

Figure 15:
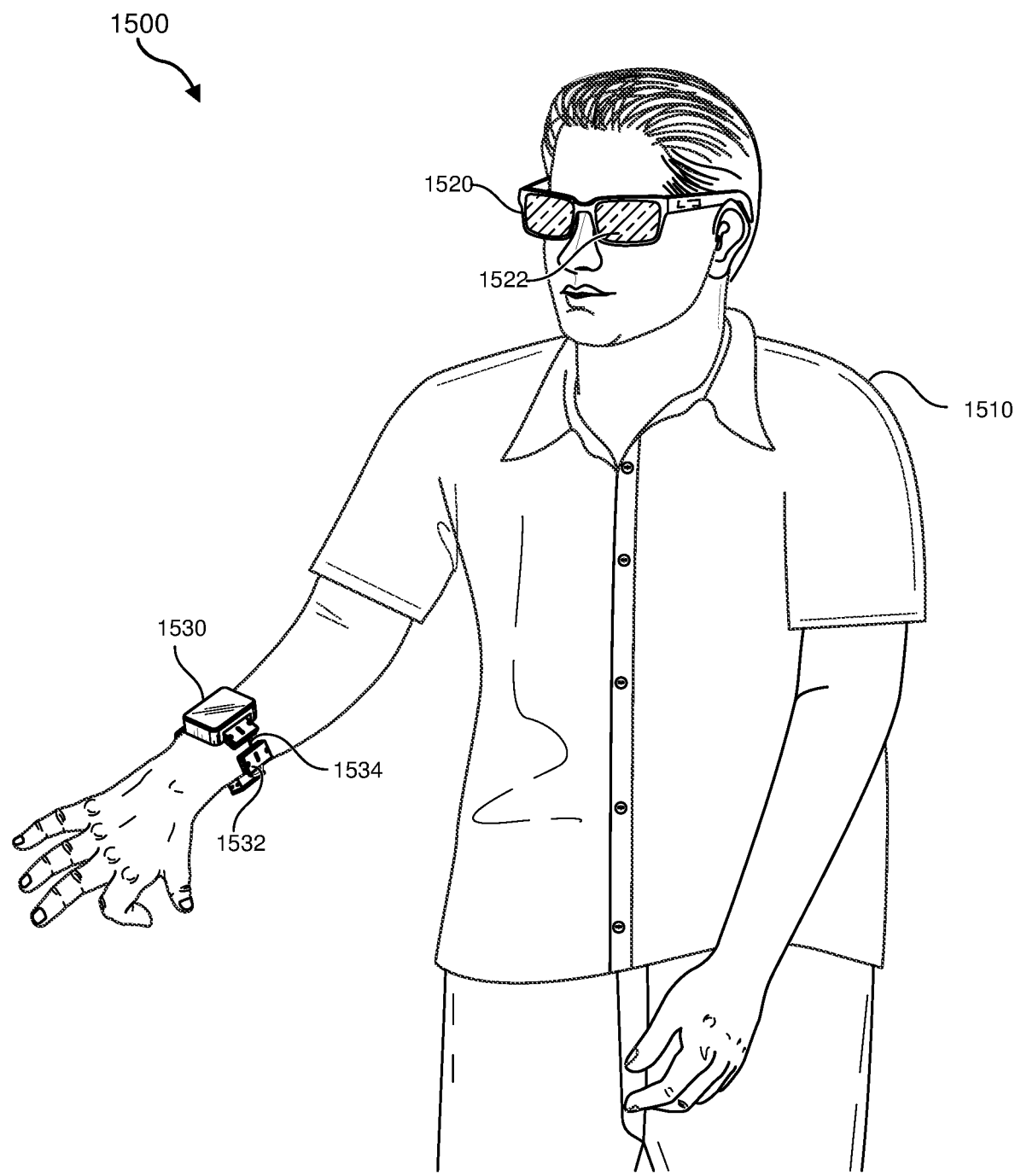
FIG. 15 is an illustration of an exemplary augmented-reality environment according to embodiments of this disclosure.

While haptic interfaces may be used with virtual-reality systems, as shown in FIG. 14, haptic interfaces may also be used with augmented-reality systems, as shown in FIG. 15. FIG. 15 is a perspective view of a user 1510 interacting with an augmented-reality system 1500. In this example, user 1510 may wear a pair of augmented-reality glasses 1520 that may have one or more displays 1522 and that are paired with a haptic device 1530. In this example, haptic device 1530 may be a wristband that includes a plurality of band elements 1532 and a tensioning mechanism 1534 that connects band elements 1532 to one another.

One or more of band elements 1532 may include any type or form of actuator suitable for providing haptic feedback. For example, one or more of band elements 1532 may be configured to provide one or more of various types of cutaneous feedback, including vibration, force, traction, texture, and/or temperature. To provide such feedback, band elements 1532 may include one or more of various types of actuators. In one example, each of band elements 1532 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1310, 1320, 1404, and 1530 may include any suitable number and/or type of haptic transducer, sensor, and/or feedback mechanism. For example, haptic devices 1310, 1320, 1404, and 1530 may include one or more mechanical transducers, piezoelectric transducers, and/or fluidic transducers. Haptic devices 1310, 1320, 1404, and 1530 may also include various combinations of different types and forms of transducers that work together or independently to enhance a user's artificial-reality experience. In one example, each of band elements 1532 of haptic device 1530 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A haptic feedback system comprising:
    an actuator;
    a supply valve coupled to the actuator;
    an exhaust valve; and
    a fluidic mass controller communicatively coupled to the supply valve and the exhaust valve, wherein the fluidic mass controller implements a machine learning model that facilitates:
        placing the exhaust valve in a state that prevents a fluid from escaping the actuator;
        activating the supply valve to fill the actuator with the fluid;
        determining that the actuator has filled with a certain amount of the fluid based at least in part on at least one electrical signal received from an electronic pressure sensor; and
        in response to determining that the actuator has filled with the certain amount of the fluid, deactivating the supply valve to trap the certain amount of the fluid in the actuator.

2. The haptic feedback system of claim 1, wherein the at least one electrical signal is indicative of a certain amount of pressure sensed in connection with the actuator.

3. The haptic feedback system of claim 2, wherein the electronic pressure sensor is placed between the actuator and a skin surface of a user wearing the haptic feedback system.

4. The haptic feedback system of claim 1, wherein:
    the actuator is deformed to a certain degree;
    a kinesthetic impedance of the actuator increases to a peak level in response to the actuator being deformed to the certain degree; and
    the kinesthetic impedance of the actuator is maintained at the peak level for as long as the actuator remains deformed to the certain degree.

5. The haptic feedback system of claim 4, wherein:
    the kinesthetic impedance of the actuator decreases to a steady state level upon termination of the deformation of the actuator; and
    the kinesthetic impedance of the actuator is maintained at the steady state level for as long as the actuator remains undeformed.

6. The haptic feedback system of claim 1, further comprising a fluid source coupled to a first port of the supply valve; and
    wherein the actuator is coupled to a second port of the supply valve.

7. The haptic feedback system of claim 6, wherein:
    the supply valve comprises a two-way valve;
    the exhaust valve comprises an additional two-way valve; and
    the actuator is further coupled to a first port of the exhaust valve.

8. The haptic feedback system of claim 6, wherein:
    the supply valve comprises a three-way valve;
    the exhaust valve comprises an additional three-way valve;
    a third port of the supply valve is coupled to a first port of the exhaust valve; and
    a second port of the exhaust valve is blocked.

9. The haptic feedback system of claim 1, wherein the fluidic mass controller further places the exhaust valve in another state that allows the fluid to escape from the actuator.

10. The haptic feedback system of claim 1, wherein the machine learning model comprises at least one of:
    a feed-forward neural network that operates without sensor feedback;
    a feed-forward neural network that relies at least in part on sensor feedback received from a pressure sensor coupled between the actuator and a skin surface of a user wearing the haptic feedback system; and
    a closed-loop neural network that continuously adjusts the certain amount of fluid in the actuator based at least in part on predicted inflation and deflations times.

11. A method comprising:
    implementing a machine learning model that facilitates controlling an actuator of a haptic feedback system;
    placing, in accordance with the machine learning model, an exhaust valve of a haptic feedback system in a state that prevents a fluid from escaping an actuator of the haptic feedback system;
    activating, in accordance with the machine learning model, a supply valve of the haptic feedback system to fill the actuator with the fluid;
    determining, in accordance with the machine learning model, that the actuator has filled with a certain amount of the fluid based at least in part on at least one electrical signal received from an electronic pressure sensor; and
    in response to determining that the actuator has filled with the certain amount of the fluid, deactivating the supply valve to trap the certain amount of the fluid in the actuator in accordance with the machine learning model.

12. The method of claim 11, wherein the at least one electrical signal is indicative of a certain amount of pressure sensed in connection with the actuator.

13. The method of claim 11, further comprising changing a kinesthetic impedance of the actuator commensurate with a deformation of the actuator.

14. The method of claim 13, wherein changing the kinesthetic impedance of the actuator commensurate with the deformation of the actuator comprises:
    causing the kinesthetic impedance of the actuator to reach a peak level in response to the actuator being deformed to a certain degree; and
    maintaining the kinesthetic impedance of the actuator at the peak level for as long as the actuator remains deformed to the certain degree.

15. The method of claim 14, wherein changing the kinesthetic impedance of the actuator commensurate with the deformation of the actuator comprises:

causing the kinesthetic impedance of the actuator to decrease to a steady state level upon termination of the deformation of the actuator; and maintaining the kinesthetic impedance of the actuator at the steady state level for as long as the actuator remains undeformed.

16. The method of claim 11, wherein:

a fluid source is coupled to a first port of the supply valve; and the actuator is coupled to a second port of the supply valve.

17. The method of claim 16, wherein:

the supply valve comprises a two-way valve;

the exhaust valve comprises an additional two-way valve; and the actuator is further coupled to a first port of the exhaust valve.

18. The method of claim 16, wherein:

the supply valve is a three-way valve;

the exhaust valve is a three-way valve;

a third port of the supply valve is coupled to a first port of the exhaust valve; and a second port of the exhaust valve is blocked.

19. The method of claim 16, further comprising placing the exhaust valve in another state that allows the fluid to escape from the actuator.

20. An artificial reality system comprising:

a head-mounted display dimensioned to be worn by a user of the artificial reality system; and a haptic feedback system communicatively coupled to the head-mounted display, wherein the haptic feedback system comprises:

an actuator;

a supply valve coupled to the actuator;

an exhaust valve; and a fluidic mass controller communicatively coupled to the supply valve and the exhaust valve, wherein the fluidic mass controller implements a machine learning model that facilitates:

placing the exhaust valve in a state that prevents a fluid from escaping the actuator;

activating the supply valve to fill the actuator with the fluid;

determining that the actuator has filled with a certain amount of the fluid based at least in part on at least one electrical signal received from an electronic pressure sensor; and in response to determining that the actuator has filled with the certain amount of the fluid, deactivating the supply valve to trap the certain amount of the fluid in the actuator.

\* \* \* \* \*